United States Patent
Shuey et al.

(10) Patent No.: US 8,073,384 B2
(45) Date of Patent: Dec. 6, 2011

(54) OPTIMIZATION OF REDUNDANCY AND THROUGHPUT IN AN AUTOMATED METER DATA COLLECTION SYSTEM USING A WIRELESS NETWORK

(75) Inventors: Kenneth C. Shuey, Zebulon, NC (US); Andrew J. Borleske, Garner, NC (US)

(73) Assignee: Elster Electricity, LLC, Raleigh, NC (US)

( * ) Notice: Subject to any disclaimer, the term of this patent is extended or adjusted under 35 U.S.C. 154(b) by 1048 days.

(21) Appl. No.: 11/610,546

(22) Filed: Dec. 14, 2006

(65) Prior Publication Data
US 2008/0144548 A1 Jun. 19, 2008

(51) Int. Cl.
| | |
|---|---|
| H04B 3/36 | (2006.01) |
| H04B 7/14 | (2006.01) |
| H04B 1/60 | (2006.01) |
| H04B 17/02 | (2006.01) |
| H04B 7/00 | (2006.01) |
| H04M 11/00 | (2006.01) |
| H04W 40/00 | (2009.01) |
| G08C 19/16 | (2006.01) |
| G08C 15/06 | (2006.01) |
| G08C 19/20 | (2006.01) |
| G08B 23/00 | (2006.01) |
| G01R 1/00 | (2006.01) |

(52) U.S. Cl. ............. 455/7; 455/9; 455/405; 455/428; 370/310; 340/870.01; 340/870.02; 340/870.03; 324/110

(58) Field of Classification Search ............ 370/310; 455/7, 9, 405, 428; 340/870.01–870.03; 324/110
See application file for complete search history.

(56) References Cited

U.S. PATENT DOCUMENTS

| | | | |
|---|---|---|---|
| 3,445,815 A | 5/1969 | Saltzberg et al. | 340/163 |
| 3,858,212 A | 12/1974 | Tompkins et al. | 343/100 CS |
| 3,878,512 A | 4/1975 | Kobayashi et al. | 340/168 R |

(Continued)

FOREIGN PATENT DOCUMENTS

CH 682196 A5 7/1993

(Continued)

OTHER PUBLICATIONS

Desbonnet, Joe et al., "System Architecture and Implementation of CEBus/Internet Gateway", *IEEE*, 1997, 1057-1062.

(Continued)

*Primary Examiner* — Nick Corsaro
*Assistant Examiner* — Munsoon Choo
(74) *Attorney, Agent, or Firm* — Woodcock Washburn LLP

(57) ABSTRACT

Techniques for optimization of redundancy and throughput in an automated meter data collection system using a wireless network are disclosed herein. The wireless network comprises a central node, a plurality of bi-directional nodes, and a plurality of transmit-only meters. Each of the bi-directional nodes is in bi-directional wireless communication with the central node and has a wireless communication path to the central node that is either a direct path or an indirect path through one or more intermediate bi-directional nodes serving as relay nodes. The transmit-only meters wirelessly transmit meter data that is then relayed by one or more bi-directional nodes to the central node. Each of the bi-directional nodes is assigned one or more authorized transmit-only meters, and each of the bi-directional nodes is configured to relay meter data only from its authorized transmit-only meters, thereby providing an optimum level of redundancy and throughput in the network.

13 Claims, 9 Drawing Sheets

U.S. PATENT DOCUMENTS

| | | | |
|---|---|---|---|
| 3,973,240 A | 8/1976 | Fong | 340/151 |
| 4,031,513 A | 6/1977 | Simciak | 340/152 T |
| 4,056,107 A | 11/1977 | Todd et al. | 130/27 |
| 4,066,964 A | 1/1978 | Costanza et al. | 325/55 |
| 4,132,981 A | 1/1979 | White | 340/203 |
| 4,190,800 A | 2/1980 | Kelly, Jr. et al. | 325/37 |
| 4,204,195 A | 5/1980 | Bogacki | 340/151 |
| 4,218,737 A | 8/1980 | Buscher et al. | 364/493 |
| 4,250,489 A | 2/1981 | Dudash et al. | 340/147 |
| 4,254,472 A | 3/1981 | Juengel et al. | 364/900 |
| 4,319,358 A | 3/1982 | Sepp | 375/1 |
| 4,321,582 A | 3/1982 | Banghart | 340/310 |
| 4,322,842 A | 3/1982 | Martinez | 370/204 |
| 4,328,581 A | 5/1982 | Harmon et al. | 371/8 |
| 4,361,851 A | 11/1982 | Asip et al. | 358/84 |
| 4,361,890 A | 11/1982 | Green, Jr. et al. | 375/1 |
| 4,396,915 A | 8/1983 | Farnsworth et al. | 340/870.03 |
| 4,405,829 A | 9/1983 | Rivest et al. | 178/22.14 |
| 4,415,896 A | 11/1983 | Allgood | 340/870.03 |
| 4,466,001 A | 8/1984 | Moore et al. | 340/825.08 |
| 4,504,831 A | 3/1985 | Jahr et al. | 340/870.03 |
| 4,506,386 A | 3/1985 | Ichikawa et al. | 455/343 |
| 4,513,415 A | 4/1985 | Martinez | 370/92 |
| 4,525,861 A | 6/1985 | Freeburg | 455/33 |
| 4,600,923 A | 7/1986 | Hicks et al. | 340/870.02 |
| 4,608,699 A | 8/1986 | Batlivala et al. | 375/216 |
| 4,611,333 A | 9/1986 | McCallister et al. | 375/1 |
| 4,614,945 A | 9/1986 | Brunius et al. | 340/870.03 |
| 4,617,566 A | 10/1986 | Diamond | 340/870.11 |
| 4,628,313 A | 12/1986 | Gombrich et al. | 340/870.02 |
| 4,631,538 A | 12/1986 | Carreno | 340/870.18 |
| 4,638,298 A | 1/1987 | Spiro | 340/827 |
| 4,644,321 A | 2/1987 | Kennon | 340/310 |
| 4,653,076 A | 3/1987 | Jerrim et al. | 375/115 |
| 4,672,555 A | 6/1987 | Hart et al. | 700/276 |
| 4,680,704 A | 7/1987 | Konicek et al. | 364/525 |
| 4,688,038 A | 8/1987 | Giammarese | 340/870.02 |
| 4,692,761 A | 9/1987 | Robinton | 340/825 |
| 4,707,852 A | 11/1987 | Jahr et al. | 379/107 |
| 4,713,837 A | 12/1987 | Gordon | 379/93 |
| 4,724,435 A | 2/1988 | Moses et al. | 340/870.13 |
| 4,728,950 A | 3/1988 | Hendrickson et al. | 340/870.31 |
| 4,734,680 A | 3/1988 | Gehman et al. | 340/539 |
| 4,749,992 A | 6/1988 | Fitzemeyer et al. | 340/870.02 |
| 4,757,456 A | 7/1988 | Benghiat | 364/464 |
| 4,769,772 A | 9/1988 | Dwyer | 364/300 |
| 4,783,748 A | 11/1988 | Swarztrauber et al. | 364/483 |
| 4,792,946 A | 12/1988 | Mayo | 70/338 |
| 4,799,059 A | 1/1989 | Grindahl et al. | 340/870.02 |
| 4,804,938 A | 2/1989 | Rouse et al. | 340/310 |
| 4,804,957 A | 2/1989 | Selph et al. | 340/870.03 |
| 4,811,011 A | 3/1989 | Sollinger | 340/870.02 |
| 4,827,514 A | 5/1989 | Ziolko et al. | 380/48 |
| 4,833,618 A | 5/1989 | Verma et al. | 364/483 |
| 4,839,645 A | 6/1989 | Lill | 340/870.17 |
| 4,841,545 A | 6/1989 | Endo et al. | 375/1 |
| 4,860,379 A | 8/1989 | Schoeneberger et al. | 455/5 |
| 4,862,493 A | 8/1989 | Venkataraman et al. | 379/107 |
| 4,868,877 A | 9/1989 | Fischer | 380/25 |
| 4,884,021 A | 11/1989 | Hammond et al. | 324/142 |
| 4,912,722 A | 3/1990 | Carlin | 375/1 |
| 4,922,518 A | 5/1990 | Gordon et al. | 379/57 |
| 4,939,726 A | 7/1990 | Flammer et al. | 370/94.1 |
| 4,940,974 A | 7/1990 | Sojka | 340/825.08 |
| 4,940,976 A | 7/1990 | Gastouniotis et al. | 340/870.02 |
| 4,958,359 A | 9/1990 | Kato | 375/1 |
| 4,964,138 A | 10/1990 | Nease et al. | 375/1 |
| 4,965,533 A | 10/1990 | Gilmore | 331/18 |
| 4,972,507 A | 11/1990 | Lusignan | 455/51 |
| 5,007,052 A | 4/1991 | Flammer | 370/85.6 |
| 5,018,165 A | 5/1991 | Sohner et al. | 375/1 |
| 5,022,046 A | 6/1991 | Morrow, Jr. | 375/1 |
| 5,032,833 A | 7/1991 | Laporte | 340/825.02 |
| 5,053,766 A | 10/1991 | Ruiz-del-Portal et al. | 340/870.02 |
| 5,053,774 A | 10/1991 | Schuermann et al. | 342/44 |
| 5,056,107 A | 10/1991 | Johnson et al. | 375/1 |
| 5,067,136 A | 11/1991 | Arthur et al. | 375/1 |
| 5,079,715 A | 1/1992 | Venkataraman et al. | 364/481 |
| 5,079,768 A | 1/1992 | Flammer | 370/94.1 |
| 5,086,292 A | 2/1992 | Johnson et al. | 340/637 |
| 5,086,385 A | 2/1992 | Launey | 364/188 |
| 5,090,024 A | 2/1992 | Vander Mey et al. | 375/1 |
| 5,111,479 A | 5/1992 | Akazawa | 375/1 |
| 5,115,433 A | 5/1992 | Baran et al. | 370/94.3 |
| 5,115,448 A | 5/1992 | Mori | 375/1 |
| 5,129,096 A | 7/1992 | Burns | 455/18 |
| 5,130,987 A | 7/1992 | Flammer | 370/103 |
| 5,132,985 A | 7/1992 | Hashimoto et al. | 375/1 |
| 5,136,614 A | 8/1992 | Hiramatsu et al. | 375/1 |
| 5,142,694 A | 8/1992 | Jackson et al. | 455/67.1 |
| 5,151,866 A | 9/1992 | Glaser et al. | 364/483 |
| 5,155,481 A | 10/1992 | Brennan, Jr. et al. | 340/870.02 |
| 5,160,926 A | 11/1992 | Schweitzer, III | 340/870.02 |
| 5,166,664 A | 11/1992 | Fish | 340/539 |
| 5,177,767 A | 1/1993 | Kato | 375/1 |
| 5,179,376 A | 1/1993 | Pomatto | 340/870.02 |
| 5,189,694 A | 2/1993 | Garland | 379/106 |
| 5,194,860 A | 3/1993 | Jones et al. | 340/370.02 |
| 5,197,095 A | 3/1993 | Bonnet | 379/107 |
| 5,204,877 A | 4/1993 | Endo et al. | 375/1 |
| 5,214,587 A | 5/1993 | Green | 364/464.04 |
| 5,225,994 A | 7/1993 | Arinobu et al. | 364/492 |
| 5,228,029 A | 7/1993 | Kotzin | 370/95.1 |
| 5,229,996 A | 7/1993 | Bäckström et al. | 370/100.1 |
| 5,239,575 A | 8/1993 | White et al. | 379/107 |
| 5,239,584 A | 8/1993 | Hershey et al. | 380/28 |
| 5,243,338 A | 9/1993 | Brennan, Jr. et al. | 340/870.02 |
| 5,252,967 A | 10/1993 | Brennan et al. | 340/870.02 |
| 5,260,943 A | 11/1993 | Comroe et al. | 370/95.1 |
| 5,270,704 A | 12/1993 | Sosa Quintana et al. | 340/870.02 |
| 5,280,498 A | 1/1994 | Tymes et al. | 375/1 |
| 5,280,499 A | 1/1994 | Suzuki | 375/1 |
| 5,285,469 A | 2/1994 | Vanderpool | 375/1 |
| 5,287,287 A | 2/1994 | Chamberlain et al. | 364/483 |
| 5,289,497 A | 2/1994 | Jacobson et al. | 375/1 |
| 5,295,154 A | 3/1994 | Meier et al. | 375/1 |
| 5,307,349 A | 4/1994 | Shloss et al. | 370/85.2 |
| 5,311,541 A | 5/1994 | Sanderford, Jr. | 375/1 |
| 5,311,542 A | 5/1994 | Eder | 375/1 |
| 5,315,531 A | 5/1994 | Oravetz et al. | 364/550 |
| 5,319,679 A | 6/1994 | Bagby | 375/106 |
| 5,329,547 A | 7/1994 | Ling | 375/1 |
| 5,345,225 A | 9/1994 | Davis | 340/635 |
| 5,359,625 A | 10/1994 | Vander Mey et al. | 375/1 |
| 5,377,222 A | 12/1994 | Sanderford, Jr. | 375/1 |
| 5,381,462 A | 1/1995 | Larson et al. | 379/107 |
| 5,383,134 A | 1/1995 | Wrzesinski | 364/514 |
| 5,384,712 A | 1/1995 | Oravetz et al. | 364/550 |
| 5,387,873 A | 2/1995 | Muller et al. | 327/155 |
| 5,390,360 A | 2/1995 | Scop et al. | 455/34.2 |
| 5,406,495 A | 4/1995 | Hill | 364/483 |
| 5,416,917 A | 5/1995 | Adair et al. | 395/500 |
| 5,420,799 A | 5/1995 | Peterson et al. | 364/483 |
| 5,428,636 A | 6/1995 | Meier | 375/202 |
| 5,430,759 A | 7/1995 | Yokev et al. | 375/202 |
| 5,432,507 A | 7/1995 | Mussino et al. | 340/870.03 |
| 5,432,815 A | 7/1995 | Kang et al. | 375/200 |
| 5,438,329 A | 8/1995 | Gastouniotis et al. | 340/870.02 |
| 5,448,230 A | 9/1995 | Schanker et al. | 340/870.03 |
| 5,448,570 A | 9/1995 | Toda et al. | 370/95.3 |
| 5,450,088 A | 9/1995 | Meier et al. | 342/51 |
| 5,452,465 A | 9/1995 | Geller et al. | 395/800 |
| 5,455,533 A | 10/1995 | Köllner | 327/484 |
| 5,455,544 A | 10/1995 | Kechkaylo | 332/103 |
| 5,455,569 A | 10/1995 | Sherman et al. | 340/825.02 |
| 5,455,822 A | 10/1995 | Dixon et al. | 370/18 |
| 5,457,713 A | 10/1995 | Sanderford, Jr. et al. | 375/206 |
| 5,461,558 A | 10/1995 | Patsiokas et al. | 364/145 |
| 5,463,657 A | 10/1995 | Rice | 375/200 |
| 5,473,322 A | 12/1995 | Carney | 340/870.02 |
| 5,475,742 A | 12/1995 | Gilbert | 379/106 |
| 5,475,867 A | 12/1995 | Blum | 455/53.1 |
| 5,479,442 A | 12/1995 | Yamamoto | 375/206 |
| 5,481,259 A | 1/1996 | Bane | 340/870.03 |

| Patent No. | Kind | Date | Inventor | Class |
|---|---|---|---|---|
| 5,488,608 | A | 1/1996 | Flammer, III | 370/85.13 |
| 5,491,473 | A | 2/1996 | Gilbert | 340/870.01 |
| 5,493,287 | A | 2/1996 | Bane | 340/825.52 |
| 5,495,239 | A | 2/1996 | Ouellette | 340/870.02 |
| 5,497,424 | A | 3/1996 | Vanderpool | 380/34 |
| 5,499,243 | A | 3/1996 | Hall | 370/85.8 |
| 5,500,871 | A | 3/1996 | Kato et al. | 375/208 |
| 5,511,188 | A | 4/1996 | Pascucci et al. | 395/600 |
| 5,519,388 | A | 5/1996 | Adair, Jr. | 340/870.02 |
| 5,521,910 | A | 5/1996 | Matthews | 370/54 |
| 5,522,044 | A | 5/1996 | Pascucci et al. | 395/200.06 |
| 5,524,280 | A | 6/1996 | Douthitt et al. | 455/62 |
| 5,525,898 | A | 6/1996 | Lee, Jr. et al. | 324/142 |
| 5,526,389 | A | 6/1996 | Buell et al. | 375/200 |
| 5,528,507 | A | 6/1996 | McNamara et al. | 364/483 |
| 5,528,597 | A | 6/1996 | Gerszberg et al. | 370/95.3 |
| 5,539,775 | A | 7/1996 | Tuttle et al. | 375/200 |
| 5,541,589 | A | 7/1996 | Delaney | 340/870.02 |
| 5,544,036 | A | 8/1996 | Brown, Jr. et al. | 364/145 |
| 5,546,424 | A | 8/1996 | Miyake | 375/206 |
| 5,548,527 | A | 8/1996 | Hemminger et al. | 364/492 |
| 5,548,633 | A | 8/1996 | Kujawa et al. | 379/93 |
| 5,553,094 | A | 9/1996 | Johnson et al. | 375/200 |
| 5,555,508 | A | 9/1996 | Munday et al. | 364/492 |
| 5,559,870 | A | 9/1996 | Patton et al. | 379/107 |
| 5,566,332 | A | 10/1996 | Adair et al. | 395/600 |
| 5,570,084 | A | 10/1996 | Ritter et al. | 340/825.05 |
| 5,572,438 | A | 11/1996 | Ehlers et al. | 364/492 |
| 5,574,657 | A | 11/1996 | Tofte | 364/510 |
| 5,590,179 | A | 12/1996 | Shincovich et al. | 379/107 |
| 5,592,470 | A | 1/1997 | Rudrapatna et al. | 370/320 |
| 5,594,740 | A | 1/1997 | LaDue | 379/59 |
| 5,602,744 | A | 2/1997 | Meek et al. | 364/464.22 |
| 5,617,084 | A | 4/1997 | Sears | 331/176 |
| 5,619,192 | A | 4/1997 | Ayala | 340/870.02 |
| 5,619,685 | A | 4/1997 | Schiavone | 395/500 |
| 5,621,629 | A | 4/1997 | Hemminer et al. | 363/56 |
| 5,627,759 | A | 5/1997 | Bearden et al. | 364/483 |
| 5,631,636 | A | 5/1997 | Bane | 340/825.69 |
| 5,636,216 | A | 6/1997 | Fox et al. | 370/402 |
| 5,640,679 | A | 6/1997 | Lundqvist et al. | 455/33.2 |
| 5,659,300 | A | 8/1997 | Dresselhuys et al. | 340/870.02 |
| 5,668,803 | A | 9/1997 | Tymes et al. | 370/312 |
| 5,668,828 | A | 9/1997 | Sanderford, Jr. et al. | 375/202 |
| 5,673,252 | A | 9/1997 | Johnson et al. | 370/449 |
| 5,684,472 | A | 11/1997 | Bane | 340/870.02 |
| 5,684,799 | A | 11/1997 | Bigham et al. | 370/397 |
| 5,691,715 | A | 11/1997 | Ouellette | 340/870.09 |
| 5,692,180 | A | 11/1997 | Lee | 395/610 |
| 5,696,501 | A | 12/1997 | Ouellette et al. | 340/870.02 |
| 5,696,765 | A | 12/1997 | Safadi | 370/436 |
| 5,696,903 | A | 12/1997 | Mahany | 395/200.58 |
| 5,699,276 | A | 12/1997 | Roos | 364/514 A |
| 5,714,931 | A | 2/1998 | Petite et al. | 340/539 |
| 5,715,390 | A | 2/1998 | Hoffman et al. | 395/188.01 |
| 5,717,604 | A | 2/1998 | Wiggins | 364/514 C |
| 5,719,564 | A | 2/1998 | Sears | 340/870.02 |
| 5,745,901 | A | 4/1998 | Entner et al. | 707/103 |
| 5,748,104 | A | 5/1998 | Argyroudis et al. | 340/870.11 |
| 5,748,619 | A | 5/1998 | Meier | 370/278 |
| 5,751,914 | A | 5/1998 | Coley et al. | 395/51 |
| 5,751,961 | A | 5/1998 | Smyk | 395/200.47 |
| 5,754,772 | A | 5/1998 | Leaf | 395/200.33 |
| 5,754,830 | A | 5/1998 | Butts et al. | 395/500 |
| 5,757,783 | A | 5/1998 | Eng et al. | 370/315 |
| 5,768,148 | A | 6/1998 | Murphy et al. | 364/492 |
| 5,778,368 | A | 7/1998 | Hogan et al. | 707/10 |
| 5,787,437 | A | 7/1998 | Potterveld et al. | 707/103 |
| 5,790,789 | A | 8/1998 | Suarez | 395/200.32 |
| 5,790,809 | A | 8/1998 | Holmes | 395/200.58 |
| 5,801,643 | A | 9/1998 | Williams et al. | 340/870.02 |
| 5,805,712 | A | 9/1998 | Davis | 380/50 |
| 5,808,558 | A | 9/1998 | Meek et al. | 340/870.01 |
| 5,809,059 | A | 9/1998 | Souissi et al. | 375/202 |
| 5,822,521 | A | 10/1998 | Gartner et al. | 395/200.6 |
| 5,850,187 | A | 12/1998 | Carrender et al. | 340/10.42 |
| 5,862,391 | A | 1/1999 | Salas et al. | 395/750.01 |
| 5,872,774 | A | 2/1999 | Wheatley, III et al. | 370/335 |
| 5,874,903 | A | 2/1999 | Shuey et al. | 340/870.02 |
| 5,875,183 | A | 2/1999 | Nitadori | 370/328 |
| 5,875,402 | A | 2/1999 | Yamawaki | 455/502 |
| 5,884,184 | A | 3/1999 | Sheffer | 455/521 |
| 5,892,758 | A | 4/1999 | Argyroudis | 370/335 |
| 5,896,382 | A | 4/1999 | Davis et al. | 370/401 |
| 5,897,607 | A | 4/1999 | Jenney et al. | 702/62 |
| 5,898,387 | A | 4/1999 | Davis et al. | 340/870.02 |
| 5,907,491 | A | 5/1999 | Canada et al. | 364/468.15 |
| 5,907,540 | A | 5/1999 | Hayashi | 370/315 |
| 5,910,799 | A | 6/1999 | Carpenter et al. | 345/333 |
| 5,923,269 | A | 7/1999 | Shuey et al. | 340/870.02 |
| 5,926,103 | A | 7/1999 | Petite | 340/825.19 |
| 5,926,531 | A | 7/1999 | Petite | 379/144 |
| 5,943,375 | A | 8/1999 | Veintimilla | 375/355 |
| 5,944,842 | A | 8/1999 | Propp et al. | 714/701 |
| 5,953,319 | A | 9/1999 | Dutta et al. | 370/238 |
| 5,958,018 | A | 9/1999 | Eng et al. | |
| 5,959,550 | A | 9/1999 | Giles | 340/870.02 |
| 5,960,074 | A | 9/1999 | Clark | 379/310 |
| 5,963,146 | A | 10/1999 | Johnson et al. | 340/870.1 |
| 5,974,236 | A | 10/1999 | Sherman | 395/200.51 |
| 5,986,574 | A | 11/1999 | Colton | 340/870.02 |
| 6,000,034 | A | 12/1999 | Lightbody et al. | 713/202 |
| 6,028,522 | A | 2/2000 | Petite | 340/641 |
| 6,034,988 | A | 3/2000 | VanderMey et al. | 375/202 |
| 6,035,201 | A | 3/2000 | Whitehead | 455/455 |
| 6,041,056 | A | 3/2000 | Bigham et al. | 370/395 |
| 6,061,604 | A | 5/2000 | Russ et al. | 700/90 |
| 6,067,029 | A | 5/2000 | Durston | 340/870.03 |
| 6,073,169 | A | 6/2000 | Shuey et al. | 709/217 |
| 6,073,174 | A | 6/2000 | Montgomerie et al. | 709/224 |
| 6,078,251 | A | 6/2000 | Landt et al. | 340/10.41 |
| 6,078,909 | A | 6/2000 | Knutson | 705/59 |
| 6,088,659 | A | 7/2000 | Kelley et al. | 702/62 |
| 6,091,758 | A | 7/2000 | Ciccone et al. | 375/132 |
| 6,100,817 | A | 8/2000 | Mason, Jr. et al. | 340/870.02 |
| 6,112,192 | A | 8/2000 | Capek | 705/59 |
| 6,124,806 | A | 9/2000 | Cunningham et al. | 340/870.02 |
| 6,128,276 | A | 10/2000 | Agee | 370/288 |
| 6,137,423 | A | 10/2000 | Glorioso et al. | 340/870.02 |
| 6,150,955 | A | 11/2000 | Tracy et al. | 340/870.02 |
| 6,154,487 | A | 11/2000 | Murai et al. | 375/150 |
| 6,160,993 | A | 12/2000 | Wilson | 455/12.1 |
| 6,172,616 | B1 | 1/2001 | Johnson et al. | 340/870.12 |
| 6,195,018 | B1 | 2/2001 | Ragle et al. | 340/870.01 |
| 6,199,068 | B1 | 3/2001 | Carpenter | 707/100 |
| 6,208,266 | B1 | 3/2001 | Lyons et al. | 340/870.02 |
| 6,218,953 | B1 | 4/2001 | Petite | 340/641 |
| 6,233,327 | B1 | 5/2001 | Petite | 379/155 |
| 6,246,677 | B1 | 6/2001 | Nap et al. | 370/346 |
| 6,249,516 | B1 | 6/2001 | Brownrigg et al. | 370/338 |
| 6,333,975 | B1 | 12/2001 | Brunn et al. | 379/106.03 |
| 6,363,057 | B1 | 3/2002 | Ardalan et al. | 370/252 |
| 6,373,399 | B1 * | 4/2002 | Johnson et al. | 340/870.11 |
| 6,393,341 | B1 | 5/2002 | Lawrence et al. | 700/286 |
| 6,396,839 | B1 | 5/2002 | Ardalan et al. | 370/401 |
| 6,421,731 | B1 | 7/2002 | Ciotti, Jr. et al. | 709/238 |
| 6,430,268 | B1 | 8/2002 | Petite | 379/39 |
| 6,437,692 | B1 | 8/2002 | Petite et al. | 340/540 |
| 6,446,192 | B1 | 9/2002 | Narasimhan et al. | 712/29 |
| 6,643,278 | B1 | 11/2003 | Panasik et al. | 370/330 |
| 6,657,549 | B1 | 12/2003 | Avery | 340/825.49 |
| 6,684,245 | B1 | 1/2004 | Shuey et al. | 709/223 |
| 6,751,563 | B2 | 6/2004 | Spanier et al. | 702/61 |
| 6,867,707 | B1 | 3/2005 | Kelley et al. | 340/870.02 |
| 2001/0002210 | A1 | 5/2001 | Petite | 379/155 |
| 2001/0024160 | A1 | 9/2001 | Petite | 340/628 |
| 2002/0012323 | A1 | 1/2002 | Petite et al. | 370/252 |
| 2002/0013679 | A1 | 1/2002 | Petite | 702/188 |
| 2002/0019712 | A1 | 2/2002 | Petite et al. | 702/61 |
| 2002/0019725 | A1 | 2/2002 | Petite | 702/188 |
| 2002/0026957 | A1 | 3/2002 | Reyman | 137/39 |
| 2002/0027504 | A1 | 3/2002 | Davis et al. | 340/540 |
| 2002/0031101 | A1 | 3/2002 | Petite | 370/310 |
| 2002/0094799 | A1 | 7/2002 | Elliott et al. | 455/405 |
| 2002/0125998 | A1 | 9/2002 | Petite et al. | 340/286.01 |
| 2002/0145537 | A1 | 10/2002 | Mueller et al. | 340/870.02 |
| 2002/0169643 | A1 | 11/2002 | Petite et al. | 705/5 |
| 2003/0036810 | A1 | 2/2003 | Petite | 700/9 |

| | | | | |
|---|---|---|---|---|
| 2003/0036822 | A1 | 2/2003 | Davis et al. | 700/295 |
| 2003/0123442 | A1 | 7/2003 | Drucker et al. | 370/392 |
| 2003/0202512 | A1 | 10/2003 | Kennedy | 370/389 |
| 2004/0001008 | A1 | 1/2004 | Shuey et al. | 340/870.02 |
| 2004/0113810 | A1 | 6/2004 | Mason, Jr. et al. | 340/870.02 |
| 2005/0083210 | A1* | 4/2005 | Shuey et al. | 340/870.03 |
| 2005/0184881 | A1 | 8/2005 | Dusenberry et al. | 340/870.02 |
| 2005/0270173 | A1 | 12/2005 | Boaz | 340/870.02 |
| 2007/0058632 | A1* | 3/2007 | Back et al. | 370/392 |
| 2007/0120705 | A1* | 5/2007 | Kiiskila et al. | 340/870.02 |
| 2007/0220606 | A1* | 9/2007 | Omote et al. | 726/24 |

FOREIGN PATENT DOCUMENTS

| | | |
|---|---|---|
| EP | 0 395 495 A1 | 10/1990 |
| EP | 0 446 979 A1 | 9/1991 |
| EP | 0 629 098 A2 | 12/1994 |
| GB | 2 118 340 A | 10/1983 |
| GB | 2 157 448 A | 10/1985 |
| GB | 2 186 404 A | 8/1987 |
| GB | 02 222 898 A | 3/1990 |
| GB | 2 237 910 A | 5/1991 |
| JP | 59-229949 | 12/1984 |
| JP | 02-67967 | 3/1990 |
| JP | 02-67967 A | 3/1990 |
| JP | 4290593 A | 10/1992 |
| JP | 05-260569 | 10/1993 |
| JP | 8194023 A | 7/1996 |
| WO | 93/02515 A1 | 2/1993 |
| WO | 93/04451 A1 | 3/1993 |
| WO | 95/32595 A1 | 11/1995 |
| WO | 96/10856 A1 | 4/1996 |
| WO | WO 2004/004364 A2 | 1/2004 |

OTHER PUBLICATIONS

Markwalter, Brian et al., "CEBus Network Layer Description", *IEEE*, 1989, 571-575.

Newtown, Harry, *Newton's Telecom Dictionary*, Flatiron Publishing, Inc., 10th Ed., 1996, LAN (1 of 1): Cebus Overview (1-3): Cebus Industry Council (1 of 1).

Newtown, Harry, *Newton's Telecom Dictionary*, 10th Edition, 1996, 243.

International Search Report issued in International Application No. PCT/US98/11170 Date of Mailing: Oct. 7, 1998.

International Search Report issued in International Application No. PCT/US98/19034 Date of Mailing: Feb. 1, 1999.

Internet Printout, http://www.ram.com BellSouth Wireless Data—Paging, Mobitex, Network, Business, Sep. 23, 1998:—Mobitex®: The Heart of Every BellSouth Solution—Mobitex Features and Services: RAM Mobile Data White Paper, Feb. 1997—Narrowband PCS Technologies: What are the Options?: RAM Mobile Data White Paper, Nov. 1997—The Inherent Security of Data Over Mobitex Wireless Packet Data Networks, A RAM Mobile Data White Paper, Oct. 1995—Comparative Analysis of Coverage and Performance: RAM & Ardis, 1998.

Internet Printout, http://www.ardis.com "Ardis Two-Way, Wireless Data Communications," ARDIS, Sep. 23, 1998.

Internet Printout, http://ww.ardis.com/RADIO "An Overview of Radio Coverage," Sep. 29, 1998 "Radio Propagation," Sep. 29, 1998 "Factors Affecting ARDIS Coverage," Sep. 29, 1998 "The ARDIS Network Compared to Other Systems," Sep. 29, 1998.

Internet Printout, http://www.ardis.com/RADIO "Radio Coverage," Sep. 29, 1998 "Glossary of Terms," Sep. 29, 1998 "Radio Propagation in Free Space," Sep. 29, 1998 "Real World Propagation Variations," Sep. 29, 1998 "Probability of Reception vs. Calculation," Sep. 29, 1998.

"MV-90 Read Only System" UTS Software Solutions for Utility Customers. (No Date). (No Page Numbers or Pages).

Rappaport, T. S., "Wireless Communications, Principles and Practice," Prentice Hall. PTR, 1996, pp. 410-413.

Brochure: TRF6900 Single-Chip RF Transceiver, Texas Instrument, 2001 ©.

Corcoran, P.M. et al., "CEBus Network Access via the World-Wide-Web", *International Conference on Consumer Electronics*, Jun. 5-7, 1996, 236-237, XP-002218722.

Corcoran, P.M. et al., "Browser-Style Interfaces to a Home Automation Network", *IEEE Trans. On Consumer Electronics*, Nov. 1, 1997, 43(4), 1063-1069, XP-000768559.

Norenkov, et al., *Telecommunication Technologies and Networks, Moscow Bauman Technical School*, 1988, (Signed for publication on Dec. 10, 1997), pp. 116-118, 80-87 [1] English Language Abstract Provided.

Brownrigg, E. Ph.D., "Developing the Information Superhighway Issues for Libraries", *Library Perspectives on NREN*, The National Research and Education Network, 1990, 55-63.

Brownrigg, E.B., "The Internet as an External Economy: The Emergence of the Invisible Hand", *Library Administration and Management*, 1991, 95-97.

Frankel, M.S., "Packet Radios Provide Link for Distributed, Survivable C3 in Post-Attack Scenarios", *MSN*, Jun. 1983, 80-108.

Gower, N. et al., "Congestion Control Using Pacing in a Packet Radio Network", *IEEE Military Communications Conference*, 1982, 1, 23.1-1, 23-1-6.

Jubin, J., "Current Packet Radio Networks Protocols", *IEEE Infocom Proceedings*, 1985, 86-92.

Kahn, R.E., "The Organization of Computer Resources into a Packet Radio Network", *IEEE Transactions on Communications*, 1977, 25(1), 169-178.

Kahn, R.E., et al., "Advances in Packet Radio Technology", *Proceedings of the IEEE*, 1978, 66(11), 1468-1496.

Lauer, G. et al., "Survivable Protocols for Large Scale Packet Radio Networks", *IEEE Global Telecommunications Conference*, 1984, 468-471.

Lynch, C.A. et al., "Electronic Publishing, Electronic Imaging, and Document Delivery", *Electronic Imaging, International Electronic Imaging Exposition & Conference*, 1986, 662-667.

Lynch, C.A. et al., "The Telecommunications Landscape", 1986, 7 pages.

Lynch, C.A. et al., "Routing, Repeating, Power Control and Directional Techniques", *Packet Radio Networks*, Architectures, Protocols, Technologies and Applications, 1987, Ch 5, 105-129, 259-274.

MacGregor, W. et al., "Multiple Control Stations in Packet Radio Networks", *IEEE Military Communications Conference*, 1982, 10.3-1-10.3-5.

Shachan, N. et al., "A Packet Radio Network for Library Automation", *IEEE Military Communications Conference*, 1987, 2, 21.3.1-21.3.7.

Shacham, N. et al., "Future Directions in Packet Radio Technology", *IEEE Infocom Proceedings*, 1985, 93-98.

Westcott, J.A., "Issues in Distributed Routing for Mobile Packet Radio Networks", *IEEE*, 1982, 233-238.

Wescott, J. et al., "A Distributed Routing Design for a Broadcast Environment", *IEEE Military Communications Conference*, 1982, 10.4-1-10.4-5.

"Packet Radio: Applications for Libraries in Developing Countries", *UDT Series on Data Communication Technologies and Standards for Libraries*, 1993, Ch 1-6, 87 pages.

Chlamtac, I. et al., "Optimizing the System of Virtual Paths", *IEEE ACM Transactions on Networking*, 1994, 2(6), 581-586.

Leung, V.C.M., "Internetworking Wireless Terminals to Local Area Networks Via Radio Bridges", *ICWC*, 1992, 126-129.

Pollini, G.P. et al., "Path Optimization Procedures for Efficient Routing of Information after an Inter-Switch Handover", *IEEE*, 1994, 1-5.

Rajagopalan, B. et al., "A New Responsive Distributed Shortest-Path Routing Algorithm", *ACM*, 1989, 237-246.

* cited by examiner

FIG. 6

| Inclusion List 601 (Bi-directional Node 226) |
|---|
| Transmit-Only Node 251 |

| Inclusion List 602 (Bi-directional Node 227) |
|---|
| Transmit-Only Node 252<br>Transmit-Only Node 253 |

| Inclusion List 603 (Bi-directional Node 228) |
|---|
| Transmit-Only Node 253<br>Transmit-Only Node 254 |

| Inclusion List 604 (Bi-directional Node 229) |
|---|
| Transmit-Only Node 254 |

| Inclusion List 605 (Bi-directional Node 230) |
|---|
| Transmit-Only Node 255 |

| Inclusion List 606 (Bi-directional Node 231) |
|---|
| Transmit-Only Node 255<br>Transmit-Only Node 256 |

# OPTIMIZATION OF REDUNDANCY AND THROUGHPUT IN AN AUTOMATED METER DATA COLLECTION SYSTEM USING A WIRELESS NETWORK

BACKGROUND OF THE INVENTION

Automated systems exist for collecting data from meters that measure usage of resources, such as gas, water and electricity. Some automated systems obtain data from such meters using a wireless network, that includes, for example, a central node in communication with a number of nodes (i.e., meters). Often, the wireless communications circuitry is incorporated into the meters themselves, such that each node in the wireless network comprises a meter having wireless communication circuitry that enables the meter to transmit its meter data. Electricity meters in such a network typically have wireless communication circuitry that permits the meter to both transmit and receive information to/from the central node. Such meters, or nodes, are referred to as bi-directional communication nodes. Bi-directional nodes are able to both transmit meter data to the central node and to receive data and instructions from the central node. In a network employing bi-directional nodes, nodes that are not within communication range of the central node may have their meter data relayed to the central node by one or more intermediate bi-directional nodes which serve as repeaters for the meter data of the transmitting node. Some networks operating in this manner are referred to as "mesh" networks.

Some meters, however, such as many water and gas meters, are only capable of transmitting meter data; they are not capable of receiving information or instructions from a wireless node. Such "one-way" nodes must always depend on the bi-directional nodes in the network to relay their meter data to the central node. An exemplary wireless network employing such nodes is depicted in FIG. 1.

As shown, central node 116 collects and stores data from a number of meters (i.e., nodes). Bi-directional nodes 221-231 may include bi-directional transmitting and receiving devices with a wireless communication path to the central node 116 that is either a direct path or an indirect path through one or more intermediate bi-directional nodes serving as relay nodes. For example, bi-directional nodes 221 and 222 have direct communications paths to central node 116, while bi-directional nodes 223-231 have indirect communications paths to central node 116 through one or more intermediate nodes. In some networks (such as the exemplary network shown in FIG. 1), each bi-directional node 221-231 has a single, designated path to the central node 116, while, in other networks, multiple dynamic paths may exist between each bi-directional node and the central node. In networks where each bi-directional node 221-231 has only a single, designated path to the central node 116, only those nodes along the designated path will relay a message from the node with that designated path. In other networks, multiple bi-directional nodes may relay, or retransmit, a message from a given node.

So-called "one-way" or "transmit-only" nodes 251-256 may include transmit-only meters such as water or gas meters. The transmit-only nodes 251-256 may gather and transmit meter data that is then relayed by one or more bi-directional nodes 221-231 to the central node 116. The system depends on the transmissions from a transmit-only device being received by at least one bi-directional node and then relayed through the network to the central node 116. Each bi-directional node may be within range and capable of receiving meter data directly from multiple transmit-only nodes. For example, bi-directional node 228 is capable of receiving meter data directly from transmit-only nodes 252-254. Consequently, the meter data transmitted by a given transmit-only node may be received by multiple bi-directional nodes and thus relayed through the network to the central node multiple times.

An advantage of the above described system is that it provides redundancy with respect to the transmission of meter data from the transmit-only meters to the central node. Specifically, because each transmit-only node may be in direct communication range of several different bi-directional nodes, multiple different communications paths may exist from each transmit-only node to the collector. For example, transmit-only node 253 may transmit its meter data to the central node 116 via a first communications path (253>227>223>221>116), a second communications path (253>228>224>222>116), or a third communications path (253>229>225>222>116). These multiple communications paths are advantageous because, even if one or more of the bi-directional nodes are not functioning properly, there is still a high probability that the meter data will be successfully relayed from the transmit-only node to the central node. For example, even if node 227 is not functioning properly, thereby rendering unsuccessful the first communications path described above, transmit-only node 253 can still successfully transmit its meter data to the central node 116 via the second or third communications paths.

While redundancy can help to provide successful data transmission, too much redundancy can be problematic because it results in too many bi-directional nodes transmitting the same meter data back to the central node. This places an unnecessary burden on the system from an overall communications traffic point of view, and this problem is exacerbated when meters are located several hop distances away from the central node. In some networks, the bi-directional meters are only allocated a fixed time period (e.g., an "exception" time) in which to relay all of their meter data to the central node. When a bi-directional meter has received meter data from a large number of transmit-only nodes, it is possible that the bi-directional meter will need to relay more data than it is able to transmit within the fixed time period. If the bi-directional meters cannot relay all of their meter data within the fixed time period, then separate individual "polled" requests may need to be issued by the central node to retrieve the excess meter data.

Thus, there is a need for a more efficient mechanism for meter data from transmit-only nodes to be received and propagated through the network to the central node.

SUMMARY OF THE INVENTION

Techniques for optimization of redundancy and throughput in an automated meter data collection system using a wireless network are disclosed herein. In an exemplary embodiment, a wireless network comprises a central node, a plurality of bi-directional nodes, and a plurality of transmit-only nodes. Each of the bi-directional nodes is in bi-directional wireless communication with the central node and has a wireless communication path to the central node that is either a direct path or an indirect path through one or more intermediate bi-directional nodes serving as relay nodes. The transmit-only nodes wirelessly transmit meter data that is then relayed by one or more bi-directional nodes to the central node. Each of the bi-directional nodes is assigned one or more authorized transmit-only nodes, and each of the bi-directional nodes is configured to relay meter data only from its authorized transmit-only nodes, thereby providing an optimum level of redundancy and throughput in the network. The authorized transmit-only nodes that are assigned to each bi-directional node may be identified in an inclusion list that may be stored at each bi-directional node.

According to an aspect of the invention, upon receiving meter data from a transmit-only node, a bi-directional node may examine its inclusion list to determine whether or not the transmit only node is an authorized transmit-only node. If the transmit-only node is an authorized transmit-only node, then the bi-directional node may relay the meter data to the central node. If, on the other hand, the transmit-only node is not an authorized transmit-only node, then the bi-directional node may simply disregard the meter data.

According to another aspect of the invention, the central node may periodically initiate a transmit-only node scan process to compile an inclusion list for each bi-directional node. The results of the scan process may identify the transmit-only nodes in communication range of each bi-directional node and the communications performance for each of the transmit-only nodes. The central node may then compile each inclusion list based on the results of the scan process and transmit each inclusion list to the corresponding bi-directional node for storage at the bi-directional node.

Other features and advantages of the invention may become apparent from the following detailed description of the invention and accompanying drawings.

BRIEF DESCRIPTION OF THE DRAWINGS

The foregoing summary, as well as the following detailed description of the invention, is better understood when read in conjunction with the appended drawings. For the purpose of illustrating the invention, there is shown in the drawings exemplary embodiments of various aspects of the invention; however, the invention is not limited to the specific methods and instrumentalities disclosed. In the drawings:

FIG. 6 is a diagram of exemplary inclusion lists in accordance with the present invention;

DETAILED DESCRIPTION OF ILLUSTRATIVE EMBODIMENTS

Exemplary systems and methods for gathering meter data are described below with reference to FIGS. 1-8. It will be appreciated by those of ordinary skill in the art that the description given herein with respect to those figures is for exemplary purposes only and is not intended in any way to limit the scope of potential embodiments.

Generally, a plurality of meter devices, which operate to track usage of a service or commodity such as, for example, electricity, water, and gas, are operable to wirelessly communicate. One or more devices, referred to herein as "collectors," are provided that "collect" data transmitted by the other meter devices so that it can be accessed by other computer systems. The collectors receive and compile metering data from a plurality of meter devices via wireless communications. A data collection server may communicate with the collectors to retrieve the compiled meter data.

Figure 2:
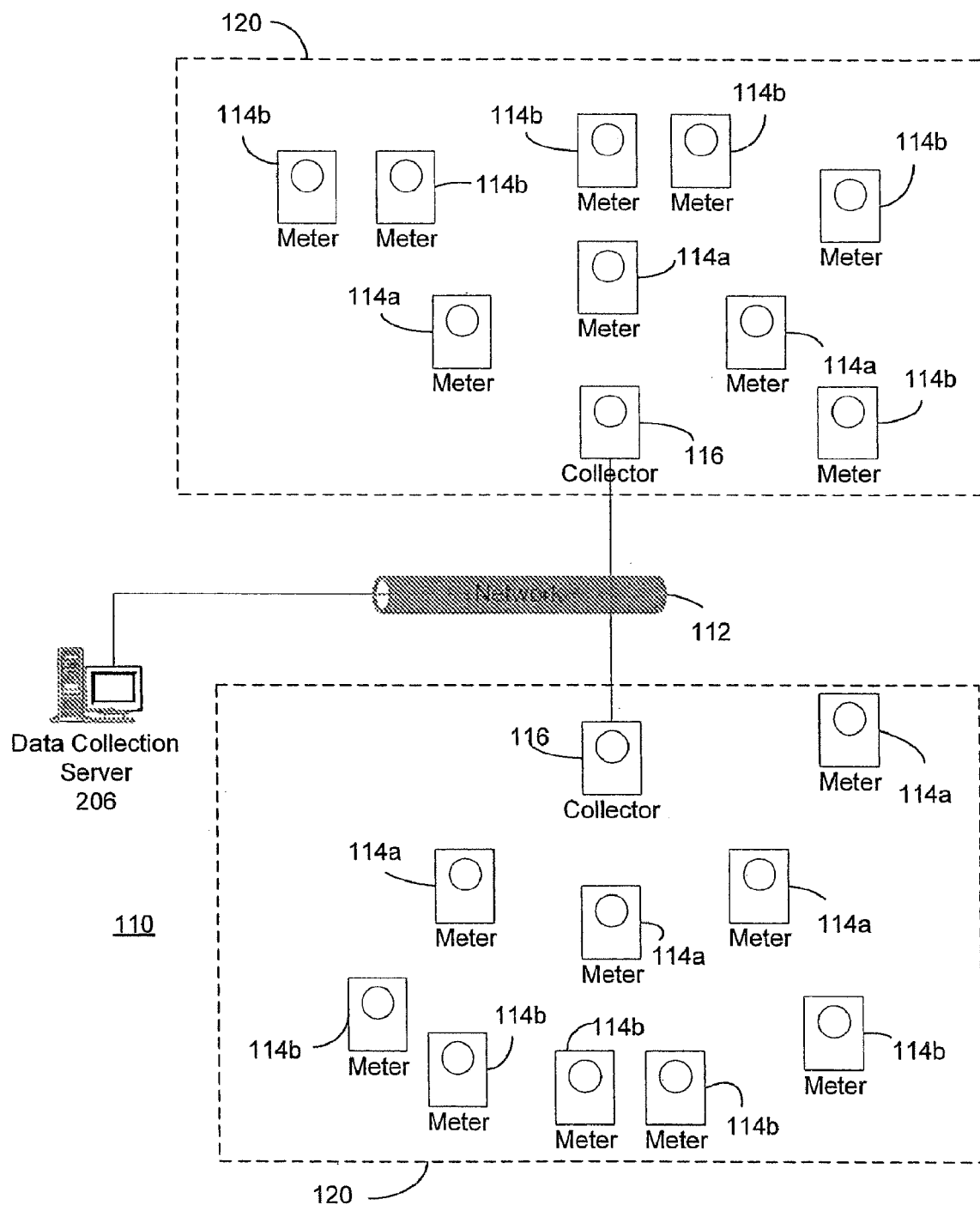
FIG. 2 is a diagram of an exemplary metering system.

FIG. 2 provides a diagram of one exemplary metering system 110. System 110 comprises a plurality of meters 114, which are operable to sense and record consumption or usage of a service or commodity such as, for example, electricity, water, or gas. Meters 114 may be located at customer premises such as, for example, a home or place of business. Meters 114 comprise circuitry for measuring the consumption of the service or commodity being consumed at their respective locations and for generating data reflecting the consumption, as well as other data related thereto. Meters 114 may also comprise circuitry for wirelessly transmitting data generated by the meter to a remote location. Meters 114 may further comprise circuitry for receiving data, commands or instructions wirelessly as well. Meters that are operable to both receive and transmit data may be referred to as "bi-directional" or "two-way" meters (or nodes), while meters that are only capable of transmitting data may be referred to as "transmit-only" or "one-way" meters. In bi-directional meters, the circuitry for transmitting and receiving may comprise a transceiver. In an illustrative embodiment, meters 114 may be, for example, electricity meters manufactured by Elster Electricity, LLC and marketed under the tradename REX.

System 110 further comprises collectors 116. In one embodiment, collectors 116 are also meters operable to detect and record usage of a service or commodity such as, for example, electricity, water, or gas. In addition, collectors 116 are operable to send data to and receive data from meters 114. Thus, like the meters 114, the collectors 116 may comprise both circuitry for measuring the consumption of a service or commodity and for generating data reflecting the consumption and circuitry for transmitting and receiving data. In one embodiment, collector 116 and meters 114 communicate with and amongst one another using any one of several wireless techniques such as, for example, frequency hopping spread spectrum (FHSS) and direct sequence spread spectrum (DSSS).

A collector 116 and the meters 114 with which it communicates define a subnet/LAN 120 of system 110. As used herein, meters 114 and collectors 116 may be referred to as "nodes" in the subnet 120. In each subnet/LAN 120, each meter transmits data related to consumption of the commodity being metered at the meter's location. The collector 116 receives the data transmitted by each meter 114, effectively "collecting" it, and then periodically transmits the data from all of the meters in the subnet/LAN 120 to a data collection server 206. The data collection server 206 stores the data for analysis and preparation of bills, for example. The data collection server 206 may be a specially programmed general purpose computing system and may communicate with collectors 116 via a network 112. The network 112 may comprise any form of network, including a wireless network or a fixed-wire network, such as a local area network (LAN), a wide area network, the Internet, an intranet, a telephone network, such as the public switched telephone network (PSTN), a Frequency Hopping Spread Spectrum (FHSS) radio network, a mesh network, a Wi-Fi (802.11) network, a Wi-Max (802.16) network, a land line (POTS) network, or any combination of the above.

Figure 3:
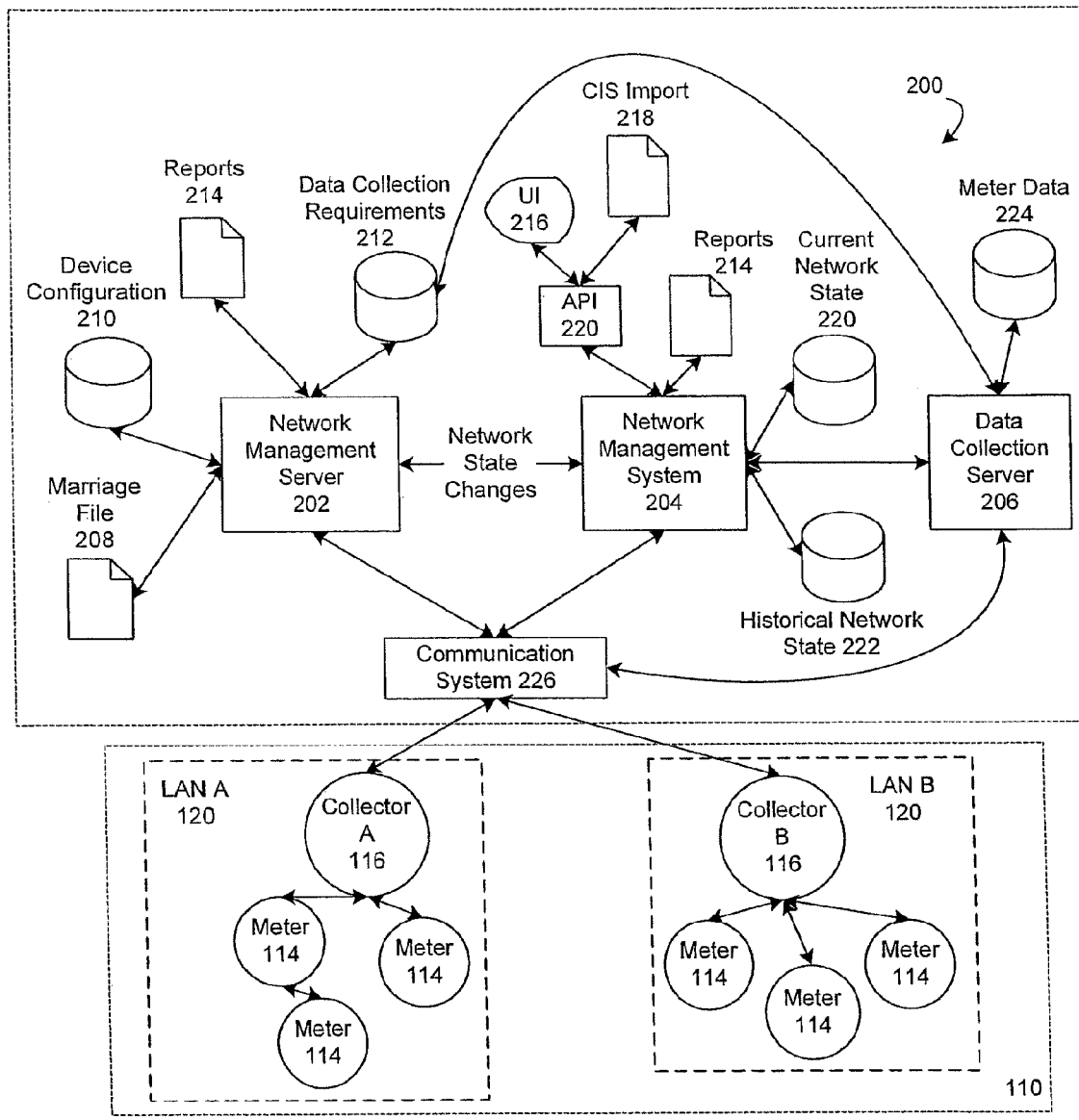
FIG. 3 expands upon the diagram of FIG. 2 and illustrates an exemplary metering system in greater detail.

Referring now to FIG. 3, further details of the metering system 110 are shown. Typically, the system will be operated by a utility company or a company providing information technology services to a utility company. As shown, the system 200 comprises a network management server 202, a network management system (NMS) 204 and the data collection server 206 that together manage one or more subnets/LANs 120 and their constituent nodes. The NMS 204 tracks changes in network state, such as new nodes registering/unregistering with the system 110, node communication paths changing, etc. This information is collected for each subnet/LAN 120 and is detected and forwarded to the network management server 202 and data collection server 206.

Each of the meters 114 and collectors 116 is assigned an identifier (LAN ID) that uniquely identifies that meter or collector on its subnet/LAN 120. In this embodiment, communication between nodes (i.e., the collectors and meters) and the system 110 is accomplished using the LAN ID. However, it is preferable for operators of a utility to query and communicate with the nodes using their own identifiers. To this end, a marriage file 208 may be used to correlate a utility's identifier for a node (e.g., a utility serial number) with both a manufacturer serial number (i.e., a serial number assigned by the manufacturer of the meter) and the LAN ID for each node in the subnet/LAN 120. In this manner, the utility can refer to the meters and collectors by the utilities identifier, while the system can employ the LAN ID for the purpose of designating particular meters during system communications.

A device configuration database 210 stores configuration information regarding the nodes. For example, in the metering system 200, the device configuration database may include data regarding time of use (TOU) switchpoints, etc. for the meters 114 and collectors 116 communicating in the system 110. A data collection requirements database 212 contains information regarding the data to be collected on a per node basis. For example, a utility may specify that metering data such as load profile, demand, TOU, etc. is to be collected from particular meter(s) 114a. Reports 214 containing information on the network configuration may be automatically generated or in accordance with a utility request.

The network management system (NMS) 204 maintains a database describing the current state of the global fixed network system (current network state 220) and a database describing the historical state of the system (historical network state 222). The current network state 220 contains data regarding current meter-to-collector assignments, etc. for each subnet/LAN 120. The historical network state 222 is a database from which the state of the network at a particular point in the past can be reconstructed. The NMS 204 is responsible for, amongst other things, providing reports 214 about the state of the network. The NMS 204 may be accessed via an API 220 that is exposed to a user interface 216 and a Customer Information System (CIS) 218. Other external interfaces may also be implemented. In addition, the data collection requirements stored in the database 212 may be set via the user interface 216 or CIS 218.

The data collection server 206 collects data from the nodes (e.g., collectors 116) and stores the data in a database 224. The data includes metering information, such as energy consumption, and may be used for billing purposes, etc. by a utility provider.

The network management server 202, network management system 204 and data collection server 206 communicate with the nodes in each subnet/LAN 120 via network 110.

Figure 4A:
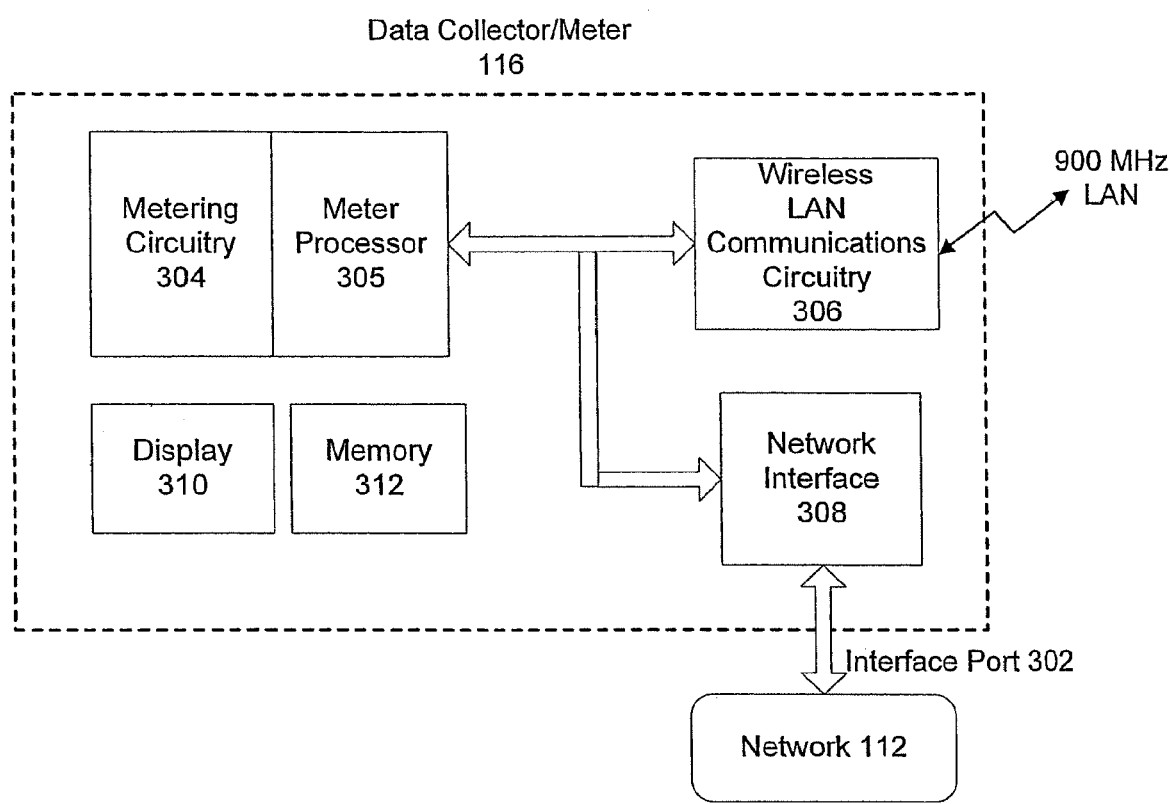
FIG. 4A is a block diagram illustrating an exemplary collector.

FIG. 4A is a block diagram illustrating further details of one embodiment of a collector 116. Although certain components are designated and discussed with reference to FIG. 3A, it should be appreciated that the invention is not limited to such components. In fact, various other components typically found in an electronic meter may be a part of collector 116, but have not been shown in FIG. 3A for the purposes of clarity and brevity. Also, the invention may use other components to accomplish the operation of collector 116. The components that are shown and the functionality described for collector 116 are provided as examples, and are not meant to be exclusive of other components or other functionality.

As shown in FIG. 4A, collector 116 may comprise metering circuitry 304 that performs measurement of consumption of a service or commodity and a processor 305 that controls the overall operation of the metering functions of the collector 116. The collector 116 may further comprise a display 310 for displaying information such as measured quantities and meter status and a memory 312 for storing data. The collector 116 further comprises wireless LAN communications circuitry 306 for communicating wirelessly with the meters 114 in a subnet/LAN and a network interface 308 for communication over the network 112.

In one embodiment, the metering circuitry 304, processor 305, display 310 and memory 312 are implemented using an A3 ALPHA meter available from Elster Electricity, Inc. In that embodiment, the wireless LAN communications circuitry 306 may be implemented by a LAN Option Board (e.g., a 900 MHz two-way radio) installed within the A3 ALPHA meter, and the network interface 308 may be implemented by a WAN Option Board (e.g., a telephone modem) also installed within the A3 ALPHA meter. In this embodiment, the WAN Option Board 308 routes messages from network 112 (via interface port 302) to either the meter processor 305 or the LAN Option Board 306. LAN Option Board 306 may use a transceiver (not shown), for example a 900 MHz radio, to communicate data to meters 114. Also, LAN Option Board 306 may have sufficient memory to store data received from meters 114. This data may include, but is not limited to the following: current billing data (e.g., the present values stored and displayed by meters 114), previous billing period data, previous season data, and load profile data.

LAN Option Board 306 may be capable of synchronizing its time to a real time clock (not shown) in A3 ALPHA meter, thereby synchronizing the LAN reference time to the time in the meter. The processing necessary to carry out the communication functionality and the collection and storage of metering data of the collector 116 may be handled by the processor 305 and/or additional processors (not shown) in the LAN Option Board 306 and the WAN Option Board 308.

The responsibility of a collector 116 is wide and varied. Generally, collector 116 is responsible for managing, processing and routing data communicated between the collector and network 112 and between the collector and meters 114. Collector 116 may continually or intermittently read the current data from meters 114 and store the data in a database (not shown) in collector 116. Such current data may include but is not limited to the total kWh usage, the Time-Of-Use (TOU) kWh usage, peak kW demand, and other energy consumption measurements and status information. Collector 116 also may read and store previous billing and previous season data from meters 114 and store the data in the database in collector 116. The database may be implemented as one or more tables of data within the collector 116.

Figure 4B:
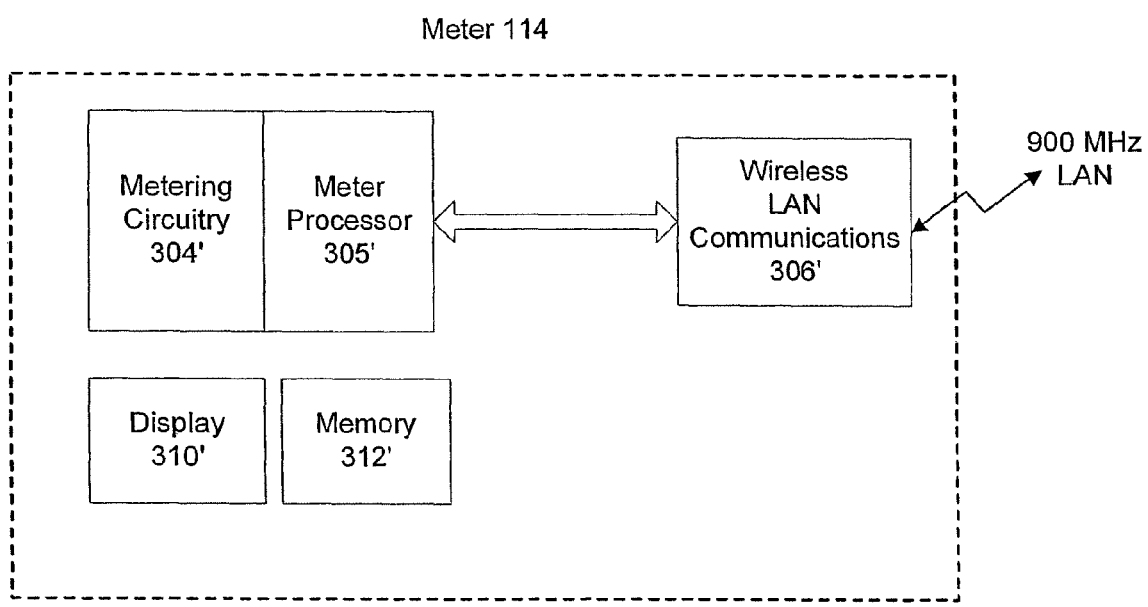
FIG. 4B is a block diagram illustrating an exemplary meter.

FIG. 4B is a block diagram of an exemplary embodiment of a meter 114 that may operate in the system 110 of FIGS. 2 and 3. As shown, the meter 114 comprises metering circuitry 304' for measuring the amount of a service or commodity that is consumed, a processor 305' that controls the overall functions of the meter, a display 310' for displaying meter data and status information, and a memory 312' for storing data and program instructions. The meter 114 further comprises wireless communications circuitry 306' for transmitting and receiving data to/from other meters 114 or a collector 116.

Referring again to FIG. 2, in the exemplary embodiment shown, a collector 116 directly communicates with only a subset of the plurality of meters 114 in its particular subnet/LAN. Meters 114 with which collector 116 directly communicates may be referred to as "level one" meters 114a. The level one meters 114a are said to be one "hop" from the collector 116. Communications between collector 116 and meters 114 other than level one meters 114a are relayed through the level one meters 114a. Thus, the level one meters 114a operate as repeaters for communications between collector 116 and meters 114 located further away in subnet 120.

Each level one meter 114a typically will only be in range to directly communicate with a subset of the remaining meters 114 in the subnet 120. The meters 114 with which the level one meters 114a directly communicate may be referred to as level two meters 114b. Level two meters 114b are one "hop" from level one meters 114a, and therefore two "hops" from collector 116. Level two meters 114b operate as repeaters for communications between the level one meters 114a and meters 114 located further away from collector 116 in the subnet 120.

While only three levels of meters are shown (collector 116, first level 114a, second level 114b) in FIG. 2, a subnet 120 may comprise any number of levels of meters 114. For example, a subnet 120 may comprise one level of meters but might also comprise eight or more levels of meters 114. In an embodiment wherein a subnet comprises eight levels of meters 114, as many as 1024 meters might be registered with a single collector 116.

As mentioned above, each meter 114 and collector 116 that is installed in the system 110 has a unique identifier (LAN ID) stored thereon that uniquely identifies the device from all other devices in the system 110. Additionally, meters 114 operating in a subnet 120 comprise information including the following: data identifying the collector with which the meter is registered; the level in the subnet at which the meter is located; the repeater meter at the prior level with which the meter communicates to send and receive data to/from the collector; an identifier indicating whether the meter is a repeater for other nodes in the subnet; and if the meter operates as a repeater, the identifier that uniquely identifies the repeater within the particular subnet, and the number of meters for which it is a repeater. Collectors 116 have stored thereon all of this same data for all meters 114 that are registered therewith. Thus, collector 116 comprises data identifying all nodes registered therewith as well as data identifying the registered path by which data is communicated from the collector to each node. Each meter 114 therefore has a designated communications path to the collector that is either a direct path (e.g., all level one nodes) or an indirect path through one or more intermediate nodes that serve as repeaters.

Information is transmitted in this embodiment in the form of packets. For most network tasks such as, for example, reading meter data, collector 116 communicates with meters 114 in the subnet 120 using point-to-point transmissions. For example, a message or instruction from collector 116 is routed through the designated set of repeaters to the desired meter 114. Similarly, a meter 114 communicates with collector 116 through the same set of repeaters, but in reverse.

In some instances, however, collector 116 may need to quickly communicate information to all meters 114 located in its subnet 120. Accordingly, collector 116 may issue a broadcast message that is meant to reach all nodes in the subnet 120. The broadcast message may be referred to as a "flood broadcast message." A flood broadcast originates at collector 116 and propagates through the entire subnet 120 one level at a time. For example, collector 116 may transmit a flood broadcast to all first level meters 114a. The first level meters 114a that receive the message pick a random time slot and retransmit the broadcast message to second level meters 114b. Any second level meter 114b can accept the broadcast, thereby providing better coverage from the collector out to the end point meters. Similarly, the second level meters 114b that receive the broadcast message pick a random time slot and communicate the broadcast message to third level meters. This process continues out until the end nodes of the subnet. Thus, a broadcast message gradually propagates outward from the collector to the nodes of the subnet 120.

The flood broadcast packet header contains information to prevent nodes from repeating the flood broadcast packet more than once per level. For example, within a flood broadcast message, a field might exist that indicates to meters/nodes which receive the message, the level of the subnet the message is located; only nodes at that particular level may re-broadcast the message to the next level. If the collector broadcasts a flood message with a level of 1, only level 1 nodes may respond. Prior to re-broadcasting the flood message, the level 1 nodes increment the field to 2 so that only level 2 nodes respond to the broadcast. Information within the flood broadcast packet header ensures that a flood broadcast will eventually die out.

Generally, a collector 116 issues a flood broadcast several times, e.g. five times, successively to increase the probability that all meters in the subnet 120 receive the broadcast. A delay is introduced before each new broadcast to allow the previous broadcast packet time to propagate through all levels of the subnet.

Meters 114 may have a clock formed therein. However, meters 114 often undergo power interruptions that can interfere with the operation of any clock therein. Accordingly, the clocks internal to meters 114 cannot be relied upon to provide an accurate time reading. Having the correct time is necessary, however, when time of use metering is being employed. Indeed, in an embodiment, time of use schedule data may also be comprised in the same broadcast message as the time. Accordingly, collector 116 periodically flood broadcasts the real time to meters 114 in subnet 120. Meters 114 use the time broadcasts to stay synchronized with the rest of the subnet 120. In an illustrative embodiment, collector 116 broadcasts the time every 15 minutes. The broadcasts may be made near the middle of 15 minute clock boundaries that are used in performing load profiling and time of use (TOU) schedules so as to minimize time changes near these boundaries. Maintaining time synchronization is important to the proper operation of the subnet 120. Accordingly, lower priority tasks performed by collector 116 may be delayed while the time broadcasts are performed.

In an illustrative embodiment, the flood broadcasts transmitting time data may be repeated, for example, five times, so as to increase the probability that all nodes receive the time. Furthermore, where time of use schedule data is communicated in the same transmission as the timing data, the subsequent time transmissions allow a different piece of the time of use schedule to be transmitted to the nodes.

Exception messages are used in subnet 120 to transmit unexpected events that occur at meters 114 to collector 116. In an embodiment, the first 4 seconds of every 32-second period are allocated as an exception window for meters 114 to transmit exception messages. Meters 114 transmit their exception messages early enough in the exception window so the message has time to propagate to collector 116 before the end of the exception window. Collector 116 may process the exceptions after the 4-second exception window. Generally, a collector 116 acknowledges exception messages, and collector 116 waits until the end of the exception window to send this acknowledgement.

In an illustrative embodiment, exception messages are configured as one of three different types of exception messages: local exceptions, which are handled directly by the collector 116 without intervention from data collection server 206; an immediate exception, which is generally relayed to data collection server 206 under an expedited schedule; and a daily exception, which is communicated to the communication server 122 on a regular schedule.

Exceptions are processed as follows. When an exception is received at collector 116, the collector 116 identifies the type of exception that has been received. If a local exception has been received, collector 116 takes an action to remedy the problem. For example, when collector 116 receives an exception requesting a "node scan request" such as discussed below, collector 116 transmits a command to initiate a scan procedure to the meter 114 from which the exception was received.

If an immediate exception type has been received, collector 116 makes a record of the exception. An immediate exception might identify, for example, that there has been a power outage. Collector 116 may log the receipt of the exception in one or more tables or files. In an illustrative example, a record of receipt of an immediate exception is made in a table referred to as the "Immediate Exception Log Table." Collector 116 then waits a set period of time before taking further action with respect to the immediate exception. For example, collector 116 may wait 64 seconds. This delay period allows the exception to be corrected before communicating the exception to the data collection server 206. For example, where a power outage was the cause of the immediate exception, collector 116 may wait a set period of time to allow for receipt of a message indicating the power outage has been corrected.

If the exception has not been corrected, collector 116 communicates the immediate exception to data collection server 206. For example, collector 116 may initiate a dial-up connection with data collection server 206 and download the exception data. After reporting an immediate exception to data collection server 206, collector 116 may delay reporting any additional immediate exceptions for a period of time such as ten minutes. This is to avoid reporting exceptions from other meters 114 that relate to, or have the same cause as, the exception that was just reported.

If a daily exception was received, the exception is recorded in a file or a database table. Generally, daily exceptions are occurrences in the subnet 120 that need to be reported to data collection server 206, but are not so urgent that they need to be communicated immediately. For example, when collector 116 registers a new meter 114 in subnet 120, collector 116 records a daily exception identifying that the registration has taken place. In an illustrative embodiment, the exception is recorded in a database table referred to as the "Daily Exception Log Table." Collector 116 communicates the daily exceptions to data collection server 206. Generally, collector 116 communicates the daily exceptions once every 24 hours.

In the present embodiment, a collector assigns designated communications paths to meters with bi-directional communication capability, and may change the communication paths for previously registered meters if conditions warrant. For example, when a collector 116 is initially brought into system 110, it needs to identify and register meters in its subnet 120. A "node scan" refers to a process of communication between a collector 116 and meters 114 whereby the collector may identify and register new nodes in a subnet 120 and allow previously registered nodes to switch paths. A collector 116 can implement a node scan on the entire subnet, referred to as a "full node scan," or a node scan can be performed on specially identified nodes, referred to as a "node scan retry."

A full node scan may be performed, for example, when a collector is first installed. The collector 116 must identify and register nodes from which it will collect usage data. The collector 116 initiates a node scan by broadcasting a request, which may be referred to as a Node Scan Procedure request. Generally, the Node Scan Procedure request directs that all unregistered meters 114 or nodes that receive the request respond to the collector 116. The request may comprise information such as the unique address of the collector that initiated the procedure. The signal by which collector 116 transmits this request may have limited strength and therefore is detected only at meters 114 that are in proximity of collector 116. Meters 114 that receive the Node Scan Procedure request respond by transmitting their unique identifier as well as other data.

For each meter from which the collector receives a response to the Node Scan Procedure request, the collector tries to qualify the communications path to that meter before registering the meter with the collector. That is, before registering a meter, the collector 116 attempts to determine whether data communications with the meter will be sufficiently reliable. In one embodiment, the collector 116 determines whether the communication path to a responding meter is sufficiently reliable by comparing a Received Signal Strength Indication (RSSI) value (i.e., a measurement of the received radio signal strength) measured with respect to the received response from the meter to a selected threshold value. For example, the threshold value may be −60 dBm. RSSI values above this threshold would be deemed sufficiently reliable. In another embodiment, qualification is performed by transmitting a predetermined number of additional packets to the meter, such as ten packets, and counting the number of acknowledgements received back from the meter. If the number of acknowledgments received is greater than or equal to a selected threshold (e.g., 8 out of 10), then the path is considered to be reliable. In other embodiments, a combination of the two qualification techniques may be employed.

If the qualification threshold is not met, the collector 116 may add an entry for the meter to a "Straggler Table." The entry includes the meter's LAN ID, its qualification score (e.g., 5 out of 10; or its RSSI value), its level (in this case level one) and the unique ID of its parent (in this case the collector's ID).

If the qualification threshold is met or exceeded, the collector 116 registers the node. Registering a meter 114 comprises updating a list of the registered nodes at collector 116. For example, the list may be updated to identify the meter's system-wide unique identifier and the communication path to the node. Collector 116 also records the meter's level in the subnet (i.e. whether the meter is a level one node, level two node, etc.), whether the node operates as a repeater, and if so, the number of meters for which it operates as a repeater. The registration process further comprises transmitting registration information to the meter 114. For example, collector 116 forwards to meter 114 an indication that it is registered, the unique identifier of the collector with which it is registered, the level the meter exists at in the subnet, and the unique identifier of its parent meter that will server as a repeater for messages the meter may send to the collector. In the case of a level one node, the parent is the collector itself. The meter stores this data and begins to operate as part of the subnet by responding to commands from its collector 116.

Qualification and registration continues for each meter that responds to the collector's initial Node Scan Procedure request. The collector 116 may rebroadcast the Node Scan Procedure additional times so as to insure that all meters 114 that may receive the Node Scan Procedure have an opportunity for their response to be received and the meter qualified as a level one node at collector 116.

The node scan process then continues by performing a similar process as that described above at each of the now registered level one nodes. This process results in the identification and registration of level two nodes. After the level two nodes are identified, a similar node scan process is performed at the level two nodes to identify level three nodes, and so on.

Specifically, to identify and register meters that will become level two meters, for each level one meter, in succession, the collector 116 transmits a command to the level one meter, which may be referred to as an "Initiate Node Scan Procedure" command. This command instructs the level one meter to perform its own node scan process. The request comprises several data items that the receiving meter may use in completing the node scan. For example, the request may comprise the number of timeslots available for responding nodes, the unique address of the collector that initiated the request, and a measure of the reliability of the communications between the target node and the collector. As described below, the measure of reliability may be employed during a process for identifying more reliable paths for previously registered nodes.

The meter that receives the Initiate Node Scan Response request responds by performing a node scan process similar to that described above. More specifically, the meter broadcasts a request to which all unregistered nodes may respond. The request comprises the number of timeslots available for responding nodes (which is used to set the period for the node to wait for responses), the unique address of the collector that initiated the node scan procedure, a measure of the reliability of the communications between the sending node and the collector (which may be used in the process of determining whether a meter's path may be switched as described below), the level within the subnet of the node sending the request, and an RSSI threshold (which may also be used in the process of determining whether a registered meter's path may be switched). The meter issuing the node scan request then waits for and receives responses from unregistered nodes. For each response, the meter stores in memory the unique identifier of the responding meter. This information is then transmitted to the collector.

For each unregistered meter that responded to the node scan issued by the level one meter, the collector attempts again to determine the reliability of the communication path to that meter. In one embodiment, the collector sends a "Qualify Nodes Procedure" command to the level one node which instructs the level one node to transmit a predetermined number of additional packets to the potential level two node and to record the number of acknowledgements received back from the potential level two node. This qualification score (e.g., 8 out of 10) is then transmitted back to the collector, which again compares the score to a qualification threshold. In other embodiments, other measures of the communications reliability may be provided, such as an RSSI value.

If the qualification threshold is not met, then the collector adds an entry for the node in the Straggler Table, as discussed above. However, if there already is an entry in the Straggler Table for the node, the collector will update that entry only if the qualification score for this node scan procedure is better than the recorded qualification score from the prior node scan that resulted in an entry for the node.

If the qualification threshold is met or exceeded, the collector 116 registers the node. Again, registering a meter 114 at level two comprises updating a list of the registered nodes at collector 116. For example, the list may be updated to identify the meter's unique identifier and the level of the meter in the subnet. Additionally, the collector's 116 registration information is updated to reflect that the meter 114 from which the scan process was initiated is identified as a repeater (or parent) for the newly registered node. The registration process further comprises transmitting information to the newly registered meter as well as the meter that will serve as a repeater for the newly added node. For example, the node that issued the node scan response request is updated to identify that it operates as a repeater and, if it was previously registered as a repeater, increments a data item identifying the number of nodes for which it serves as a repeater. Thereafter, collector 116 forwards to the newly registered meter an indication that it is registered, an identification of the collector 116 with which it is registered, the level the meter exists at in the subnet, and the unique identifier of the node that will serve as its parent, or repeater, when it communicates with the collector 116.

The collector then performs the same qualification procedure for each other potential level two node that responded to the level one node's node scan request. Once that process is completed for the first level one node, the collector initiates the same procedure at each other level one node until the process of qualifying and registering level two nodes has been completed at each level one node. Once the node scan procedure has been performed by each level one node, resulting in a number of level two nodes being registered with the collector, the collector will then send the Initiate Node Scan Response command to each level two node, in turn. Each level two node will then perform the same node scan procedure as performed by the level one nodes, potentially resulting in the registration of a number of level three nodes. The process is then performed at each successive node, until a maximum number of levels is reached (e.g., seven levels) or no unregistered nodes are left in the subnet.

It will be appreciated that in the present embodiment, during the qualification process for a given node at a given level, the collector qualifies the last "hop" only. For example, if an unregistered node responds to a node scan request from a level four node, and therefore, becomes a potential level five node, the qualification score for that node is based on the reliability of communications between the level four node and the potential level five node (i.e., packets transmitted by the level four node versus acknowledgments received from the potential level five node), not based on any measure of the reliability of the communications over the full path from the collector to the potential level five node. In other embodiments, of course, the qualification score could be based on the full communication path.

At some point, each meter will have an established communication path to the collector which will be either a direct path (i.e., level one nodes) or an indirect path through one or more intermediate nodes that serve as repeaters. If during operation of the network, a meter registered in this manner fails to perform adequately, it may be assigned a different path or possibly to a different collector as described below.

As previously mentioned, a full node scan may be performed when a collector 116 is first introduced to a network. At the conclusion of the full node scan, a collector 116 will have registered a set of meters 114 with which it communicates and reads metering data. Full node scans might be periodically performed by an installed collector to identify new meters 114 that have been brought on-line since the last node scan and to allow registered meters to switch to a different path.

In addition to the full node scan, collector 116 may also perform a process of scanning specific meters 114 in the subnet 120, which is referred to as a "node scan retry." For example, collector 116 may issue a specific request to a meter 114 to perform a node scan outside of a full node scan when on a previous attempt to scan the node, the collector 116 was unable to confirm that the particular meter 114 received the node scan request. Also, a collector 116 may request a node scan retry of a meter 114 when during the course of a full node scan the collector 116 was unable to read the node scan data from the meter 114. Similarly, a node scan retry will be performed when an exception procedure requesting an immediate node scan is received from a meter 114.

The system 110 also automatically reconfigures to accommodate a new meter 114 that may be added. More particularly, the system identifies that the new meter has begun operating and identifies a path to a collector 116 that will become responsible for collecting the metering data. Specifically, the new meter will broadcast an indication that it is unregistered. In one embodiment, this broadcast might be, for example, embedded in, or relayed as part of a request for an update of the real time as described above. The broadcast will be received at one of the registered meters 114 in proximity to the meter that is attempting to register. The registered meter 114 forwards the time to the meter that is attempting to register. The registered node also transmits an exception request to its collector 116 requesting that the collector 116 implement a node scan, which presumably will locate and register the new meter. The collector 116 then transmits a request that the registered node perform a node scan. The registered node will perform the node scan, during which it requests that all unregistered nodes respond. Presumably, the newly added, unregistered meter will respond to the node scan. When it does, the collector will then attempt to qualify and then register the new node in the same manner as described above.

Once a communication path between the collector and a meter is established, the meter can begin transmitting its meter data to the collector and the collector can transmit data and instructions to the meter. As mentioned above, data is transmitted in packets. "Outbound" packets are packets transmitted from the collector to a meter at a given level. In one embodiment, outbound packets contain the following fields, but other fields may also be included:
  Length—the length of the packet;
  SrcAddr—source address—in this case, the ID of the collector;
  DestAddr—the LAN ID of the meter to which the packet addressed;
  RptPath—the communication path to the destination meter (i.e., the list of identifiers of each repeater in the path from the collector to the destination node); and
  Data—the payload of the packet.
The packet may also include integrity check information (e.g., CRC), a pad to fill-out unused portions of the packet and other control information. When the packet is transmitted from the collector, it will only be forwarded on to the destination meter by those repeater meters whose identifiers appear in the RptPath field. Other meters that may receive the packet, but that are not listed in the path identified in the RptPath field will not repeat the packet.

"Inbound" packets are packets transmitted from a meter at a given level to the collector. In one embodiment, inbound packets contain the following fields, but other fields may also be included:
  Length—the length of the packet;
  SrcAddr—source address—the address of the meter that initiated the packet;
  DestAddr—the ID of the collector to which the packet is to be transmitted;
  RptAddr—the ID of the parent node that serves as the next repeater for the sending node;
  Data—the payload of the packet;
Because each meter knows the identifier of its parent node (i.e., the node in the next lower level that serves as a repeater for the present node), an inbound packet need only identify who is the next parent. When a node receives an inbound packet, it checks to see if the RptAddr matches its own identifier. If not, it discards the packet. If so, it knows that it is supposed to forward the packet on toward the collector. The node will then replace the RptAddr field with the identifier of its own parent and will then transmit the packet so that its parent will receive it. This process will continue through each repeater at each successive level until the packet reaches the collector.

For example, suppose a meter at level three initiates transmission of a packet destined for its collector. The level three node will insert in the RptAddr field of the inbound packet the identifier of the level two node that serves as a repeater for the level three node. The level three node will then transmit the packet. Several level two nodes may receive the packet, but only the level two node having an identifier that matches the identifier in the RptAddr field of the packet will acknowledge it. The other will discard it. When the level two node with the matching identifier receives the packet, it will replace the RptAddr field of the packet with the identifier of the level one packet that serves as a repeater for that level two packet, and the level two packet will then transmit the packet. This time, the level one node having the identifier that matches the RptAddr field will receive the packet. The level one node will insert the identifier of the collector in the RptAddr field and will transmit the packet. The collector will then receive the packet to complete the transmission.

A collector 116 periodically retrieves meter data from the meters that are registered with it. For example, meter data may be retrieved from a meter every 4 hours. Where there is a problem with reading the meter data on the regularly scheduled interval, the collector will try to read the data again before the next regularly scheduled interval. Nevertheless, there may be instances wherein the collector 116 is unable to read metering data from a particular meter 114 for a prolonged period of time. The meters 114 store an indication of when they are read by their collector 116 and keep track of the time since their data has last been collected by the collector 116. If the length of time since the last reading exceeds a defined threshold, such as for example, 18 hours, presumably a problem has arisen in the communication path between the particular meter 114 and the collector 116. Accordingly, the meter 114 changes its status to that of an unregistered meter and attempts to locate a new path to a collector 116 via the process described above for a new node. Thus, the exemplary system is operable to reconfigure itself to address inadequacies in the system.

In some instances, while a collector 116 may be able to retrieve data from a registered meter 114 occasionally, the level of success in reading the meter may be inadequate. For example, if a collector 116 attempts to read meter data from a meter 114 every 4 hours but is able to read the data, for example, only 70 percent of the time or less, it may be desirable to find a more reliable path for reading the data from that particular meter. Where the frequency of reading data from a meter 114 falls below a desired frequency, the collector 116 transmits a message to the meter 114 to respond to node scans going forward. The meter 114 remains registered but will respond to node scans in the same manner as an unregistered node as described above. In other embodiments, all registered meters may be permitted to respond to node scans, but a meter will only respond to a node scan if the path to the collector through the meter that issued the node scan is shorter (i.e., less hops) than the meter's current path to the collector. A lesser number of hops is assumed to provide a more reliable communication path than a longer path. A node scan request always identifies the level of the node that transmits the request, and using that information, an already registered node that is permitted to respond to node scans can determine if a potential new path to the collector through the node that issued the node scan is shorter than the node's current path to the collector.

If an already registered meter 114 responds to a node scan procedure, the collector 116 recognizes the response as originating from a registered meter but that by re-registering the meter with the node that issued the node scan, the collector may be able to switch the meter to a new, more reliable path. The collector 116 may verify that the RSSI value of the node scan response exceeds an established threshold. If it does not, the potential new path will be rejected. However, if the RSSI threshold is met, the collector 116 will request that the node that issued the node scan perform the qualification process described above (i.e., send a predetermined number of packets to the node and count the number of acknowledgements received). If the resulting qualification score satisfies a threshold, then the collector will register the node with the new path. The registration process comprises updating the collector 116 and meter 114 with data identifying the new repeater (i.e. the node that issued the node scan) with which the updated node will now communicate. Additionally, if the repeater has not previously performed the operation of a repeater, the repeater would need to be updated to identify that it is a repeater. Likewise, the repeater with which the meter previously communicated is updated to identify that it is no longer a repeater for the particular meter 114. In other embodiments, the threshold determination with respect to the RSSI value may be omitted. In such embodiments, only the qualification of the last "hop" (i.e., sending a predetermined number of packets to the node and counting the number of acknowledgements received) will be performed to determine whether to accept or reject the new path.

In some instances, a more reliable communication path for a meter may exist through a collector other than that with which the meter is registered. A meter may automatically recognize the existence of the more reliable communication path, switch collectors, and notify the previous collector that the change has taken place. The process of switching the registration of a meter from a first collector to a second collector begins when a registered meter 114 receives a node scan request from a collector 116 other than the one with which the meter is presently registered. Typically, a registered meter 114 does not respond to node scan requests. However, if the request is likely to result in a more reliable transmission path, even a registered meter may respond. Accordingly, the meter determines if the new collector offers a potentially more reliable transmission path. For example, the meter 114 may determine if the path to the potential new collector 116 comprises fewer hops than the path to the collector with which the meter is registered. If not, the path may not be more reliable and the meter 114 will not respond to the node scan. The meter 114 might also determine if the RSSI of the node scan packet exceeds an RSSI threshold identified in the node scan information. If so, the new collector may offer a more reliable transmission path for meter data. If not, the transmission path may not be acceptable and the meter may not respond. Additionally, if the reliability of communication between the potential new collector and the repeater that would service the meter meets a threshold established when the repeater was registered with its existing collector, the communication path to the new collector may be more reliable. If the reliability does not exceed this threshold, however, the meter 114 does not respond to the node scan.

If it is determined that the path to the new collector may be better than the path to its existing collector, the meter 114 responds to the node scan. Included in the response is information regarding any nodes for which the particular meter may operate as a repeater. For example, the response might identify the number of nodes for which the meter serves as a repeater.

The collector 116 then determines if it has the capacity to service the meter and any meters for which it operates as a repeater. If not, the collector 116 does not respond to the meter that is attempting to change collectors. If, however, the collector 116 determines that it has capacity to service the meter 114, the collector 116 stores registration information about the meter 114. The collector 116 then transmits a registration command to meter 114. The meter 114 updates its registration data to identify that it is now registered with the new collector. The collector 116 then communicates instructions to the meter 114 to initiate a node scan request. Nodes that are unregistered, or that had previously used meter 114 as a repeater respond to the request to identify themselves to collector 116. The collector registers these nodes as is described above in connection with registering new meters/nodes.

Under some circumstances it may be necessary to change a collector. For example, a collector may be malfunctioning and need to be taken off-line. Accordingly, a new communication path must be provided for collecting meter data from the meters serviced by the particular collector. The process of replacing a collector is performed by broadcasting a message to unregister, usually from a replacement collector, to all of the meters that are registered with the collector that is being removed from service. In one embodiment, registered meters may be programmed to only respond to commands from the collector with which they are registered. Accordingly, the command to unregister may comprise the unique identifier of the collector that is being replaced. In response to the command to unregister, the meters begin to operate as unregistered meters and respond to node scan requests. To allow the unregistered command to propagate through the subnet, when a node receives the command it will not unregister immediately, but rather remain registered for a defined period, which may be referred to as the "Time to Live". During this time to live period, the nodes continue to respond to application layer and immediate retries allowing the unregistration command to propagate to all nodes in the subnet. Ultimately, the meters register with the replacement collector using the procedure described above.

One of collector's 116 main responsibilities within subnet 120 is to retrieve metering data from meters 114. In one embodiment, collector 116 has as a goal to obtain at least one successful read of the metering data per day from each node in its subnet. Collector 116 attempts to retrieve the data from all nodes in its subnet 120 at a configurable periodicity. For example, collector 116 may be configured to attempt to retrieve metering data from meters 114 in its subnet 120 once every 4 hours. In greater detail, in one embodiment, the data collection process begins with the collector 116 identifying one of the meters 114 in its subnet 120. For example, collector 116 may review a list of registered nodes and identify one for reading. The collector 116 then communicates a command to the particular meter 114 that it forward its metering data to the collector 116. If the meter reading is successful and the data is received at collector 116, the collector 116 determines if there are other meters that have not been read during the present reading session. If so, processing continues. However, if all of the meters 114 in subnet 120 have been read, the collector waits a defined length of time, such as, for example, 4 hours, before attempting another read.

If during a read of a particular meter, the meter data is not received at collector 116, the collector 116 begins a retry procedure wherein it attempts to retry the data read from the particular meter. Collector 116 continues to attempt to read the data from the node until either the data is read or the next subnet reading takes place. In an embodiment, collector 116 attempts to read the data every 60 minutes. Thus, wherein a subnet reading is taken every 4 hours, collector 116 may issue three retries between subnet readings.

Figure 1:
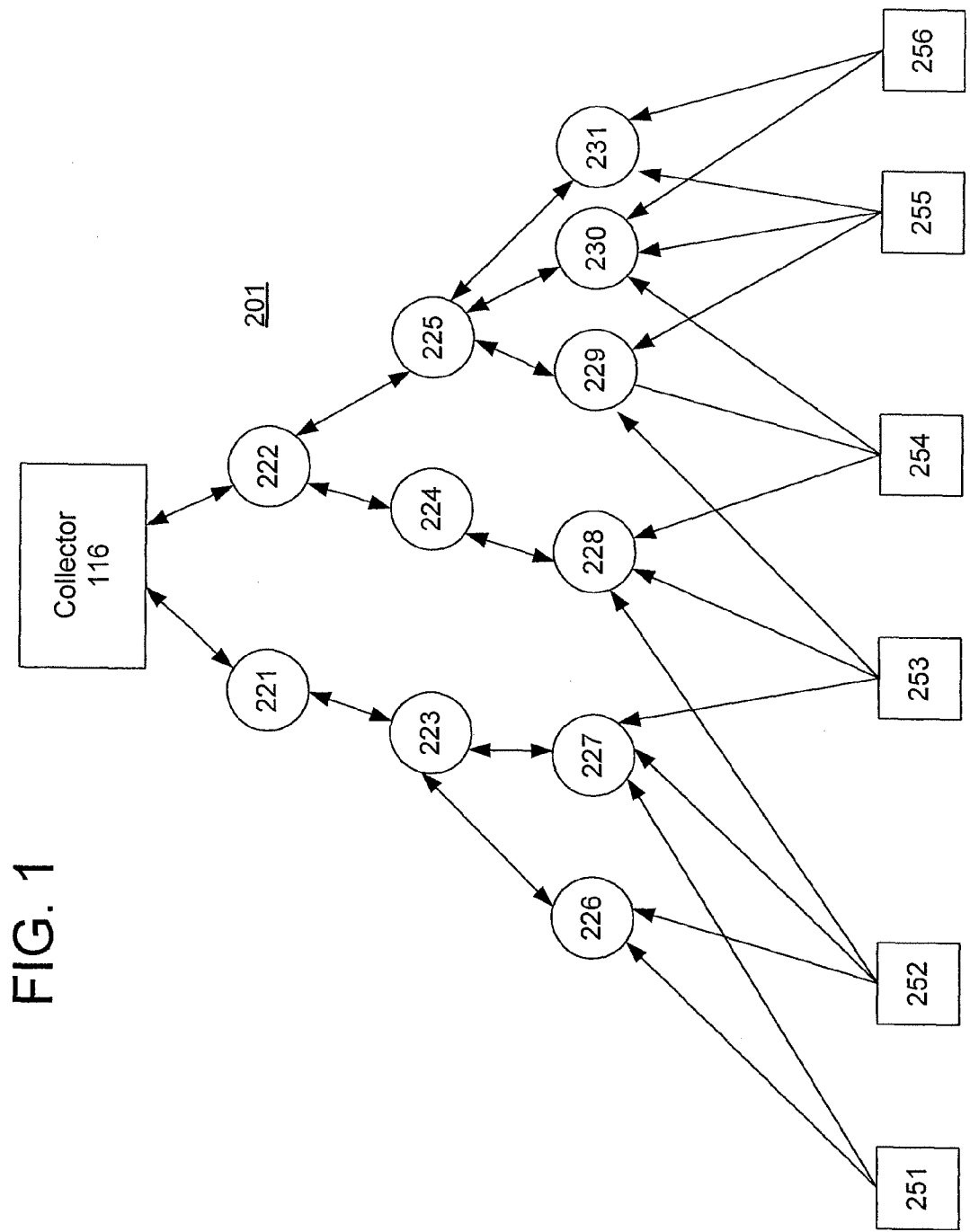
FIG. 1 is a diagram of an exemplary subnet of a wireless network for collecting data from remote devices.

As described above, existing systems for collecting meter data may use a wireless network that includes a central node in communication with a number of bi-directional nodes and a number of transmit-only nodes. In some of these networks each of the bi-directional nodes has a single designated transmission path to the central node. For example, referring back FIG. 1, assume that the subnet/LAN 201 illustrated in FIG. 1 is a network in which each bi-directional node has a single designated transmission path to the central node 116. Third level node 227 has a designated transmission path to central node 116 through second level node 223 and, in turn, through first level node 221. In this embodiment, communication path data which designates this transmission path is provided by central node 116 to third level node 227 and to second level node 223. Specifically, the communication path data provided to third level node 227 identifies second level node 223 as its designated node to which to transmit data. Additionally, the communication path data provided to second level node 223 identifies first level node 221 as its designated node to which to transmit data.

In this embodiment, although each of the bi-directional nodes 221-231 has a single designated transmission path to the central node 116, the transmit-only nodes 251-256 do not have single designated transmission paths to the central node 116. This is because, unlike the bi-directional nodes 221-231, the transmit-only nodes 251-256 are incapable of receiving communications path data to assign them a designated node to which to transmit their meter data. Thus, transmissions from the transmit-only nodes 251-256 cannot be limited to a designated bi-directional node or nodes. Rather, the transmit-only nodes broadcast their meter data to all bi-directional nodes within their communications range, thereby creating multiple transmission paths from each transmit-only node 251-256 to the central node 116. In a network in which the bi-directional nodes can also have multiple transmission paths to the central node, the multiplicity of transmissions from the transmit-only nodes is even greater.

As described above, the current inability to limit transmission paths from transmit-only nodes 251-256 to the central node 116 is problematic because it results in too many bi-directional nodes attempting to relay the same meter data back to the central node 116. This places an unnecessary burden on the system from an overall communications traffic point of view, and this problem is exacerbated when transmit-only are located several hop distances away from the central node 116.

The present invention provides techniques for optimizing redundancy and throughput such that a limited number of transmission paths can be selected and designated from each transmit-only node 251-256 to the central node 116, thereby increasing available network bandwidth and performance by reducing redundant communications traffic. The techniques set forth in detail below involve assigning to certain bi-directional nodes a limited number of authorized transmit-only nodes. The bi-directional nodes are configured to only relay meter data from their assigned authorized transmit-only nodes. The bi-directional nodes may simply disregard any meter data received from non-authorized transmit-only nodes. Accordingly, in the following description, a connection between a bi-directional node and one of its authorized transmit-only nodes may be referred to as an "authorized transmission path," while a connection between a bi-directional node and a non-authorized transmit-only node may be referred to as a "non-authorized transmission path."

Figure 5:
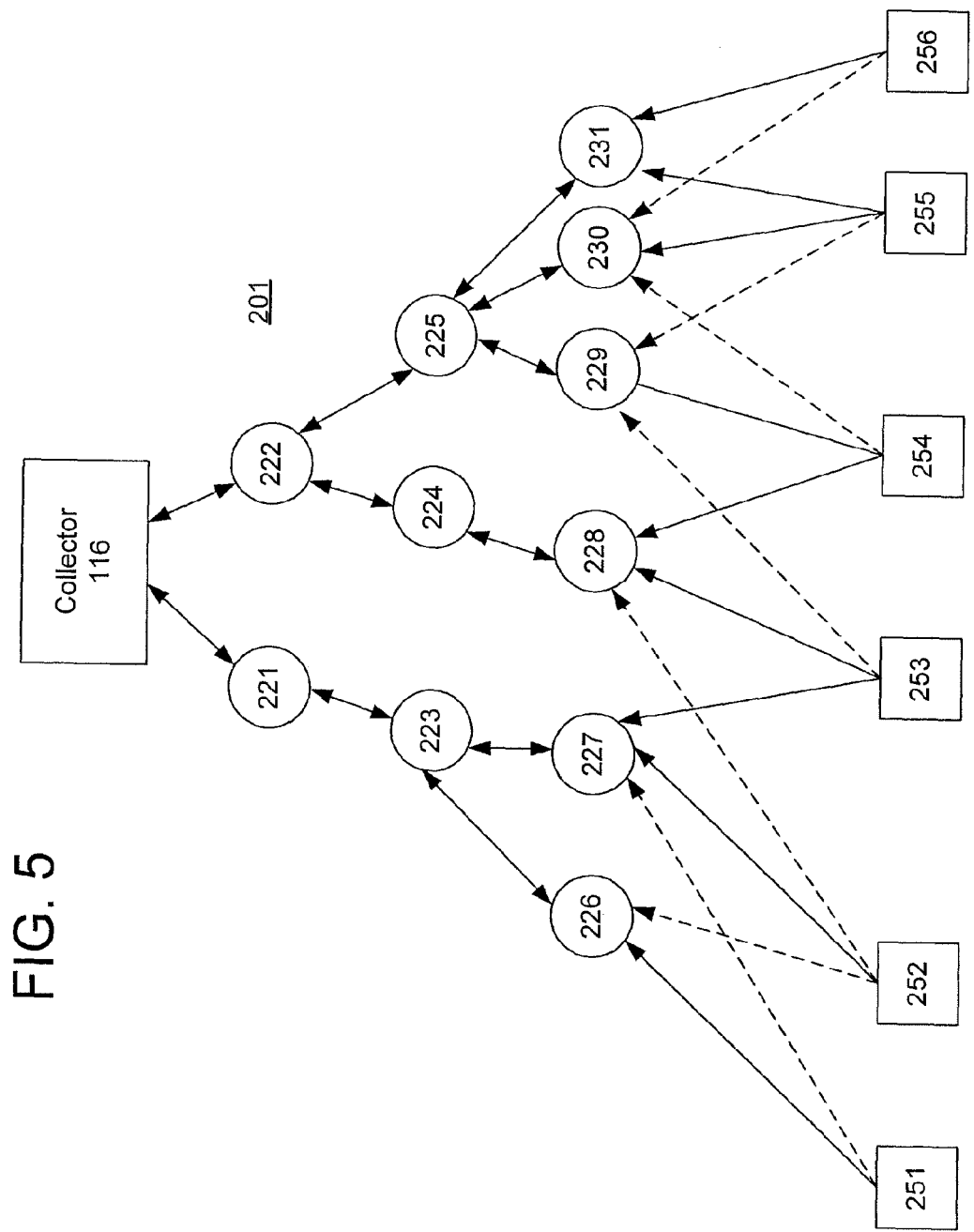
FIG. 5 is a diagram of an exemplary optimized subnet of a wireless network for collecting data from remote devices in accordance with the present invention.

An exemplary wireless subnet/LAN in accordance with the present invention is shown in FIG. 5, in which authorized transmission paths are depicted with solid lines and non-authorized transmission paths are depicted with dashed lines. In this embodiment, the subnet/LAN 201 operates in the manner described in connection with the exemplary system of FIGS. 2 and 3, where each bi-directional node has a single designated transmission path back to the central node. It is understood, however, that the present invention can also be employed in systems in which the bi-directional nodes may have multiple redundant paths back to the central node.

Referring to FIG. 5, in this exemplary embodiment, the transmission path from transmit-only node 251 to bi-directional node 226 is an authorized transmission path, while the transmission path from transmit-only node 251 to bi-directional node is 227 is a non-authorized transmission path. Thus, even though transmit-only 251 is capable of transmitting its meter data to bi-directional node 227, bi-directional node 227 will not relay the meter data to bi-directional node 223. Accordingly, as shown in FIG. 5, a single authorized transmission path (251>226>223>221>116) is established between transmit only node 251 and central node 116. This single authorized transmission path increases available network bandwidth and performance by eliminating redundant communications traffic from transmit-only node 251. Specifically, bi-directional node 227 will not relay meter data from transmit-only node 251, thereby freeing up bi-directional node 227 to relay meter data from its assigned authorized transmit-only nodes 252 and 253.

As should be appreciated, while transmit-only node 251 has only a single authorized transmission path to central node 116, it may be advantageous to allow more than one authorized transmission path from a transmit-only node to a central node 116. For example, as shown in FIG. 5, transmit-only node 253 has two authorized transmission paths to central node 116 (253>227>223>221>116) and (253>228>224>222>116). Creating multiple authorized transmission paths from a transmit-only node to a central node allows for some redundancy in the case of a malfunction at an intermediate bi-directional node. For example, a malfunction at bi-directional node 227 may block transmission of meter data from transmit-only node 253 over its first authorized transmission path (253>227>223>221>116) because that first path includes bi-directional node 227. However, meter data can still be transmitted successfully from transmit-only node 253 along its second authorized transmission path (253>228>224>222>116) because that second path does not include bi-directional node 227.

It should be noted again that, while the collection of data from transmit-only nodes by the collector has been described above in the context of a network of bi-directional nodes 221-231 that operate in the manner described in connection with the embodiments described above, it is understood that the present invention is not limited to the particular form of network established and utilized by the nodes 221-231 to transmit data to the collector. Rather, the present invention may be used in the context of any network topology in which a plurality of bi-directional communication nodes are capable of transmitting data and of having that data propagated through the network of nodes to the collector. For example, the present invention may also be implemented in a network in which each bi-directional node does not have a single designated path to the central node, but, rather, has multiple dynamic paths to the central node. In fact, in such a network, due to the presence of these multiple dynamic paths to the central node, there may even be a greater need to optimize redundancy and improve communications throughput to the central node.

In an embodiment of the present invention, the authorized transmit-only nodes assigned to each bi-directional node may be identified in an inclusion list that is stored at each bi-directional node. FIG. 6 depicts an exemplary set of inclusion lists for each of the third level bi-directional nodes shown in FIG. 5. As shown, inclusion list 601 corresponds to bi-directional node 226 and identifies transmit-only node 251 as the authorized transmit-only node assigned to bi-directional node 226. Inclusion list 602 corresponds to bi-directional node 227 and identifies transmit-only nodes 252 and 253 as the authorized transmit-only nodes assigned to bi-directional node 227. Inclusion list 603 corresponds to bi-directional node 228 and identifies transmit-only nodes 253 and 254 as the authorized transmit-only nodes assigned to bi-directional node 228. Inclusion list 604 corresponds to bi-directional node 229 and identifies transmit-only node 254 as the authorized transmit-only node assigned to bi-directional node 229. Inclusion list 605 corresponds to bi-directional node 230 and identifies transmit-only node 255 as the authorized transmit-only node assigned to bi-directional node 230. Inclusion list 606 corresponds to bi-directional node 231 and identifies transmit-only nodes 255 and 256 as the authorized transmit-only nodes assigned to bi-directional node 231.

Figure 7:
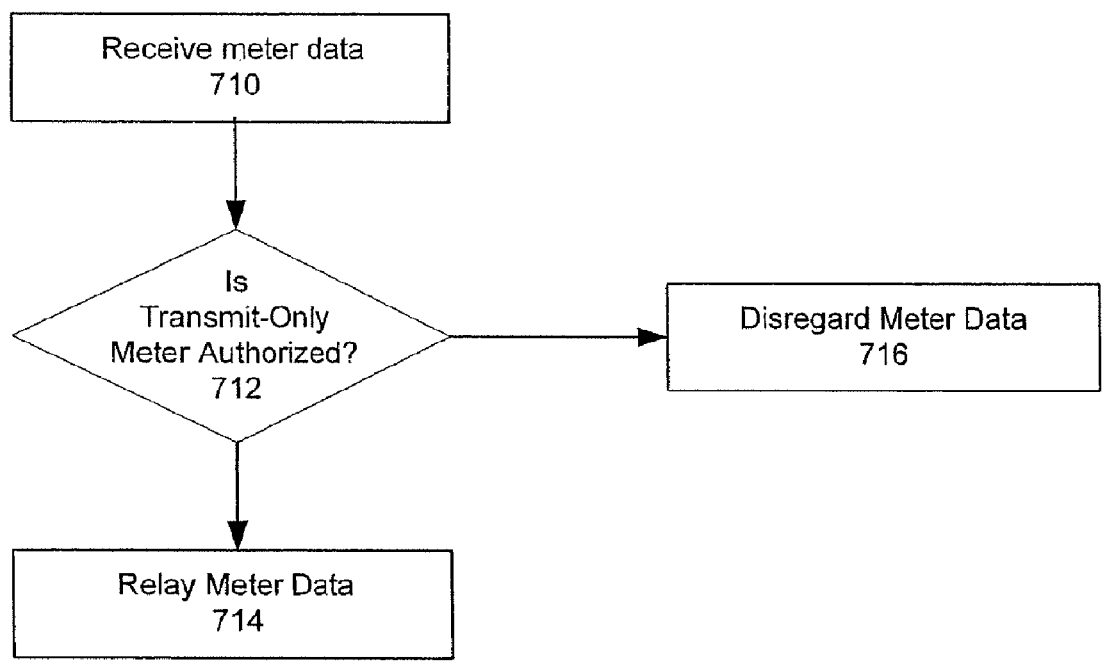
FIG. 7 is a flowchart of an exemplary method for directing meter data at a bi-directional node in accordance with the present invention.

As described above, each bi-directional node may direct meter data from transmit-only nodes in accordance with the inclusion list that is stored at the bi-directional node. A flowchart of an exemplary method for directing meter data at a bi-directional node in accordance with the present invention is depicted in FIG. 7. At act 710, meter data is received at a bi-directional node from a transmit-only node. For example, at act 710 bi-directional node 227 may receive meter data that is transmitted from transmit-only node 252. At act 712, the bi-directional node determines whether or not the transmit-only node from which it received the meter data is an authorized transmit-only node. The bi-directional node may make this determination by examining an inclusion list that is stored at the bi-directional node. For example, at act 712, bi-directional node 227 may examine its inclusion list 602 and determine that transmit-only meter 252 is one of the authorized transmit-only meters identified in its inclusion list 602. If the transmit-only meter is an authorized transmit only meter, then, at act 714, the bi-directional meter relays the meter data to an upstream node. For example, at act 714, bi-directional node 227 will relay the meter data from transmit-only meter 252 to bi-directional node 223. The meter data will then, in turn, be relayed to bi-directional node 221 and, eventually, to central node 116.

In addition to receiving meter data from authorized transmit-only nodes, bi-directional nodes may also receive meter data from non-authorized transmit-only nodes. For example, at act 710, bi-directional node 227 may receive meter data from transmit-only node 251. Then, at act 712, bi-directional node 227 may examine its inclusion list 602 and determine that transmit-only meter 251 is not one of the authorized transmit-only meters identified in inclusion list 602. In this scenario, at act 716, bi-directional node 227 will simply disregard the meter data from transmit-only meter 251.

To employ the techniques described above, it is first necessary to determine which transmit-only nodes should be assigned as authorized transmit-only nodes to each bi-directional node. In one embodiment, this determination may be made by performing a transmit-only node scan process to identify which transmit-only nodes are capable of transmitting to each bi-directional node and to evaluate the communications performance of each of the identified transmit-only nodes. The transmit-only node scan process may be performed repeatedly at a regular interval such as, for example, once a month. The transmit-only node scan process may include all bi-directional nodes in the subnet or, alternatively, the transmit-only node scan process may be limited to only certain bi-directional nodes. For example, the first time that the transmit-only node scan process is performed, it may include all bi-directional nodes within the subnet. Then, subsequent transmit-only node scan processes may be limited to only those bi-directional nodes which were previously identified as being within range of one or more transmit-only nodes.

The transmit-only node scan process may be performed either in conjunction with, or separately from, the bi-directional node scan process described above in paragraphs 0055-0072. As described above, the bi-directional node scan process employs a leveled approach in which level one nodes are first identified and then monitored to identify level two nodes. This process is then repeated recursively for each remaining level of bi-directional nodes within the subnet. If the transmit-only nodes scan process is performed in conjunction with the bi-directional node scan process, then each identified bi-directional node may, in addition to being monitored to identify a subsequent level of bi-directional nodes, also be monitored to identify transmit-only nodes from which it is capable of receiving transmissions and to evaluate the communications performance of each of the identified transmit-only nodes.

The transmit-only node scan process may employ a number of different techniques to evaluate the communications performance of the transmit-only nodes. These techniques may include one or more of the same techniques described above with respect to the bi-directional node scan process. For example, the communications performance of a transmit-only node may be evaluated based on a Received Signal Strength Indication (RSSI) value (i.e., a measurement of the received radio signal strength) from the transmit-only node. Any other technique may also be employed that enables an evaluation of the ability of a transmit-only node to successfully transmit data to a bi-directional node.

Figure 8:
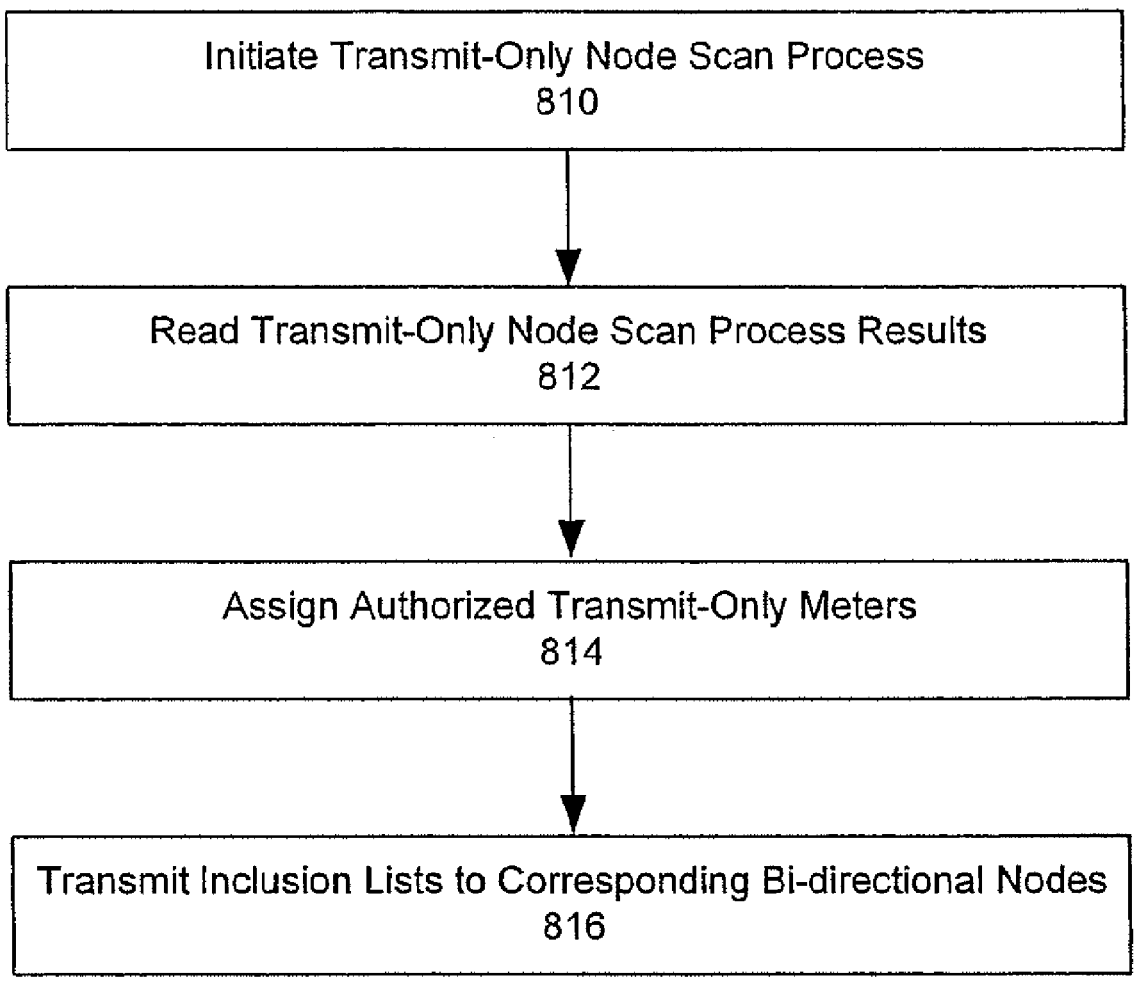
FIG. 8 is a flowchart of an exemplary method for performing a transmit-only node scan process in accordance with the present invention.

An exemplary transmit-only node scan process technique in accordance with the present invention is depicted in FIG. 8. At act 810, central node 116 initiates the transmit-only node scan process by identifying the bi-directional nodes that are to be included in the scan process and instructing those bi-directional nodes to gather and record transmissions from one or more transmit-only nodes. Each bi-directional node may be instructed to gather transmissions from every transmit-only node that the bi-directional node is within transmission range of. Alternatively, each bi-directional node may be instructed to gather and record transmissions from only a limited number of transmit-only nodes. For example, each bi-directional node may be instructed to gather and record transmissions from no more than eight transmit-only nodes.

At act 812, central node 116 reads results from each of the bi-directional nodes included in the transmit-only node scan process. The results from each bi-directional node may include an identification of each transmit-only node from which transmissions were received and information regarding the communications performance of each of the identified transmit-only nodes. The results received from each of the bi-directional nodes may be stored at the central node.

At act 814, central node 116 uses the results to determine a set of authorized transmit-only nodes to assign to each bi-directional node. A number of different techniques may be employed to make this determination. In one exemplary technique, for each bi-directional node, central node 116 may assign all transmit-only nodes that are capable of transmitting to the bi-directional node above a pre-determined threshold communications performance to be authorized transmit-only nodes. The pre-determined threshold communications performance may be a pre-determined (RSSI) value such as, for example, −60 dBm. In another exemplary technique, central node 116 may assign only up to a limited number of transmit-only nodes with the best communications performance relative to one another to be the authorized transmit only nodes. Because transmits are periodic, the transmit-only nodes performance relative to one another may be determined, for example, based on received messages within a fixed time period.

In another exemplary technique, the number of bi-directional nodes for which a particular transmit-only node can serve as an authorized transmit-only node may be limited to a pre-determined number. For example, each transmit-only node may be limited to serving as an authorized transmit-only node for no more than two bi-directional nodes. Thus, for example, as shown in FIG. 5, even though transmit-only node 253 is capable of transmitting to three bi-directional nodes (227, 228 and 229), transmit-only node 253 may be excluded from serving as an authorized transmit-only node for one of these bi-directional nodes because it is limited to two. Limiting the authorized transmit-only nodes in this manner may provide a simple and effective way to create an optimum level of redundancy within the network.

In another exemplary technique, each transmit-only node must be assigned as an authorized transmit-only node to at least one bi-directional node, thereby ensuring that each transmit-only node has at least one authorized transmission path to the central node. Any combination of the above described techniques or any other additional techniques may be employed to create an optimum balance of redundancy and traffic within the network.

As described above, the authorized transmit-only nodes assigned to each bi-directional node may be identified in an inclusion list associated with each respective bi-directional node. If a bi-directional node is new to the system, then its inclusion list may be created at act 814 based on the results of the transmit-only node scan process. Alternatively, if an existing bi-directional node already has an inclusion list, then the existing inclusion list may be reduced, expanded, or simply left unchanged based on the results of the transmit-only node scan process. Thus, the transmit-only node scan process may either completely or partially change the authorized transmission paths from a particular transmit-only node to the central node. At act 816, the new or edited inclusion lists are transmitted from the central node to each corresponding bi-directional node.

In addition to and in combination with the optimization techniques described above, throughput of meter data may be further improved by enabling each bi-directional node to relay meter data from multiple authorized transmit-only nodes in a single data packet. Typically, a transmit-only node will broadcast meter consumption data, meter status data, and load profile data to the bi-directional nodes. Conventional bi-directional nodes will then relay the meter consumption data, meter status data, and load profile data up to the central node. However, improved throughput can be achieved when the bi-directional nodes strip the load profile data from the meter data and then relay only the meter consumption data and the meter status data. Stripping the load profile data in this manner may enable the bi-directional nodes to relay data from multiple authorized transmit-only nodes in a single data packet.

While systems and methods have been described and illustrated with reference to specific embodiments, those skilled in the art will recognize that modification and variations may be made without departing from the principles described above and set forth in the following claims. For example, although in the embodiments described above, the systems and methods of the present invention are described in the context of a network of metering devices, such as electricity, gas, or water meters, it is understood that the present invention can be implemented in any kind of network in which it is necessary to obtain information from or to provide information to end devices in the system, including without limitation, networks comprising meters, in-home displays, in-home thermostats, load control devices, or any combination of such devices. Accordingly, reference should be made to the following claims as describing the scope of the present invention.

What is claimed:

1. A wireless network comprising:
a central node;
a plurality of bi-directional nodes in bi-directional wireless communication with the central node, each of the bi-directional nodes having a wireless communication path to the central node that is either a direct path or an indirect path through one or more intermediate bi-directional nodes serving as relay nodes; and
a plurality of transmit-only meters that wirelessly transmit meter data that is then relayed by one or more bi-directional nodes to the central node,
the central node configured to receive information concerning the one-way communication performance between a bi-directional node and each of a set of transmit-only meters in range of the bi-directional node, to compile a list of a subset of the transmit-only meters from which data is permitted to be relayed by said bi-directional node, and to transmit the list to said bi-directional node.

2. The wireless network of claim 1, wherein each bi-directional node has a single, designated path to the central node.

3. The wireless network of claim 1, wherein each bi-directional node has multiple, dynamic paths to the central node.

4. A method for optimizing redundancy and throughput in a wireless network comprising a central node, a plurality of bi-directional nodes in bi-directional wireless communication with the central node, and a plurality of transmit-only meters that wirelessly transmit meter data that is then relayed by one or more bi-directional nodes to the central node, wherein each of the bi-directional nodes has a wireless communication path to the central node that is either a direct path or an indirect path through one or more intermediate bi-directional nodes serving as relay nodes, the method comprising the following steps performed at a first bi-directional node:

storing a list of transmit-only meters from which the bi-directional node is permitted to receive and relay meter data, the list comprising a subset of said plurality of transmit-only meters, the list having been compiled based on results of a scan process that evaluates the one-way communications performance of each of a set of transmit-only meters in communication range of the bi-directional node;

receiving meter data from a first transmit-only meter;

determining whether or not the first transmit-only meter is in the stored list; and relaying the meter data received from the first transmit-only meter if the first transmit-only meter is in the stored list, but not relaying the meter data if the first transmit-only meter is not in the stored list.

5. The method of claim 4, comprising relaying the meter data to the central node indirectly through one or more intermediate bi-directional nodes serving as relay nodes.

6. The method of claim 4, comprising relaying the meter data directly to the central node as part of a single data packet that includes meter data from multiple transmit-only meters included in the stored list.

7. The method of claim 6, further comprising stripping load profile data from the meter data from the multiple authorized transmit-only meters.

8. A method for optimizing redundancy and throughput in a wireless network comprising a central node, a plurality of bi-directional nodes in bi-directional wireless communication with the central node, and a plurality of transmit-only meters that wirelessly transmit meter data that is then relayed by one or more bi-directional nodes to the central node, wherein each of the bi-directional nodes has a wireless communication path to the central node that is either a direct path or an indirect path through one or more intermediate bi-directional nodes serving as relay nodes, the method comprising:

receiving results of a scan process involving a set of transmit-only meters in communication range of a bi-directional node, the results comprising data that reflects a one-way communications performance of each of the set of transmit-only meters in communication range of the bi-directional node;

selecting, based on the results of the scan process, less than all of the transmit-only meters in the set of transmit-only meters and storing an identifier of each selected transmit-only meter in a list;

receiving meter data from a transmit-only meter;

determining whether or not an identifier of the transmit-only meter from which the meter data was received is in the stored list; and relaying the meter data received from the transmit-only meter if the transmit-only meter is in the stored list, but not relaying the meter data if the first transmit-only meter is not in the stored list.

9. The method of claim 8, further comprising dynamically updating the list based on updated results from a repeatedly performed scan process.

10. The method of claim 8, wherein said selecting comprises selecting transmit-only meters that communicate with the bi-directional node with a received signal strength exceeding a threshold level.

11. The method of claim 8, wherein said selecting comprises selecting a pre-determined number of transmit-only meters with a best communication performance relative to one another.

12. The method of claim 8, each transmit-only meter may be included in the stored lists of a predetermined maximum number of bi-directional nodes, and wherein the method further comprises:

not selecting and not storing in the list a transmit-only meter from the set of transmit-only meters in communication range of the bi-directional node if it is determined that transmit-only meter has already been included in the stored lists of the predetermined maximum number of other bi-directional nodes.

13. The method of claim 8, further comprising ensuring that each transmit-only meter in the set of transmit-only meters is stored in the list of at least one bi-directional node.

* * * * *